US012711898B2

(12) United States Patent
Deighton

(10) Patent No.: US 12,711,898 B2
(45) Date of Patent: Aug. 18, 2026

(54) METHODS AND SYSTEMS FOR SPECTRAL CONTROL OF LIGHT

(71) Applicant: Brompton Technology Limited, London (GB)

(72) Inventor: Christopher Michael Deighton, London (GB)

(73) Assignee: Brompton Technology Limited (GB)

( * ) Notice: Subject to any disclaimer, the term of this patent is extended or adjusted under 35 U.S.C. 154(b) by 205 days.

(21) Appl. No.: 18/299,464

(22) Filed: Apr. 12, 2023

(65) Prior Publication Data

US 2024/0321180 A1 Sep. 26, 2024

(30) Foreign Application Priority Data

Mar. 20, 2023 (NL) ..................................... 2034386

(51) Int. Cl.
*G09G 3/20* (2006.01)
*G09G 3/32* (2016.01)

(52) U.S. Cl.
CPC ....... *G09G 3/32* (2013.01); *G09G 2300/0452* (2013.01); *G09G 2320/0626* (2013.01); *G09G 2320/0666* (2013.01)

(58) Field of Classification Search
CPC ............. G09G 3/32; G09G 2300/0452; G09G 2320/0626; G09G 2320/0666
USPC ........................................................... 345/55
See application file for complete search history.

(56) References Cited

U.S. PATENT DOCUMENTS

| | | | | |
|---|---|---|---|---|
| 2012/0026210 | A1* | 2/2012 | Yano | G09G 3/3607 345/87 |
| 2012/0176042 | A1* | 7/2012 | Hatley | H05B 45/20 315/152 |
| 2013/0202203 | A1* | 8/2013 | Bryant | H04N 9/67 382/167 |
| 2018/0227560 | A1* | 8/2018 | Fredlund | H04N 23/63 |
| 2020/0312255 | A1* | 10/2020 | Miyazawa | H04N 5/20 |

* cited by examiner

*Primary Examiner* — Jonathan M Blancha
(74) *Attorney, Agent, or Firm* — Bradley Arant Boult Cummings LLP; Adam J. Thompson

(57) ABSTRACT

A computer-implemented method for displaying spectral components of light to be, or being, emitted by one or more components of a display panel is disclosed. The method may comprise providing, to a user display of a user device, one or more representations of the spectral components of light to be, or being, emitted by the one or more components of the display panel. The method may also comprise receiving, from a user interface of the user device, one or more spectral parameter control values indicative of a variation of the spectral components of light to be, or being, emitted. The method may also comprise providing, to the user display, an updated representation of the spectral components of light to be, or being, emitted. The updated representation of the spectral components of light may be adjusted based on the one or more spectral parameter control values.

17 Claims, 21 Drawing Sheets

METHODS AND SYSTEMS FOR SPECTRAL CONTROL OF LIGHT

CROSS-REFERENCE TO RELATED APPLICATIONS

This application claims the benefit of and priority to Netherland Application No. 2034386, filed Mar. 20, 2023, and entitled "LED PANEL CONTROL METHODS AND SYSTEMS," which is incorporated by reference in its entirety herein.

FIELD

The present disclosure relates to methods and systems for controlling spectral characteristics of light. More specifically, but not exclusively, methods for controlling characteristics of video panels are disclosed. For example, approaches to boosting brightness and varying spectral characteristics are disclosed. In addition, methods for improving user control of such characteristics are provided.

BACKGROUND

A standard LED video screen consists of a tightly packed array of pixels where each pixel comprises red, green, and blue (RGB) LEDs. A standard video signal also contains information for the brightness of each red, green, and blue element of each pixel so there is a simple mapping of the video data to the screen. More sophisticated LED video screens may also contain processing systems that will adjust the incoming video signal to allow for the calibration, temperature, and other variable parameters of the particular LEDs and screen construction. Such a system facilitates the display of colours that are true to the incoming signal and that match standards for those signals.

While historically LED screens have been used for large live outdoor event screens, e.g. at concerts or music festivals, as well as for advertising, e.g. at trade shows, in recent years it has become popular to use LED screens as backdrops to sets in film and television productions. In such applications, the LED screens can play a dual purpose, especially when the screen extends beyond the field of view of the camera and in some cases encapsulates the production set. Firstly, the LED screen or screens play the primary role of being a backdrop to a set enabling dynamic background content to be displayed behind objects or actors being filmed. Secondly, the LED screens light the objects or people being filmed including lighting aspects of a physical set.

While RGB LEDs are the optimal choice for most direct-view applications, their spectral output is 'spiky'. In particular, the radiation of each LED is focused around specific red, green and blue wavelengths. This is non-ideal if the screen is used for lighting purposes, as the gaps in the spectral output result in poor colour rendering. For example, skin-tones under RGB illumination typically show a reddish tint. Such problems can worsen the darker the skin tone of the subject being lit. These issues can therefore result in poor colour quality in recorded footage where LED screens are used for backdrop and lighting purposes. Furthermore, the majority of LED screens used in film and television productions have not been designed specifically for such a use case. As such, they are not designed to provide engineers on set with control over the LED panels in a way that provides preferable technical control in the film and television production environment.

SUMMARY

A computer-implemented method for displaying spectral components of light to be, or being, emitted by one or more components of a display panel is disclosed. The method may comprise providing, to a user display of a user device, one or more representations of the spectral components of light to be, or being, emitted by the one or more components of the display panel. The method may also comprise receiving, from a user interface of the user device, one or more spectral parameter control values indicative of a variation of the spectral components of light to be, or being, emitted. The method may also comprise providing, to the user display, an updated representation of the spectral components of light to be, or being, emitted. The updated representation of the spectral components of light may be adjusted based on the one or more spectral parameter control values.

The display panel may comprise a plurality of RGBF LED units, each RGBF LED unit may comprise a Red LED, a Green LED, a Blue LED and a Fourth-colour LED that is not the same colour as the Red, Green or Blue LEDs.

The one or more representations of the spectral components of light may comprise one or more of: a representation of the total spectrum of light to be, or being, emitted; a representation of a spectral component provided by the Red LED; a representation of a spectral component provided by the Green LED; a representation of a spectral component provided by the Blue LED; and a representation of a spectral component provided by the Fourth-colour LED.

The variation may be indicative of the effect of varying drive signals to one or more of the LEDs of the RGBF LED unit. One of the one or more spectral parameter control values may shift a spectral balance between use of the Red, Green and Blue LEDs with respect to use of the Fourth-colour LED. One of the one or more spectral parameter control values may vary one or more brightness levels of the LEDs while substantially maintaining a colour and a brightness defined by received video data. The brightness of light emitted by the one or more components of a display panel may be increased.

The one or more spectral parameter control values may be indicative of one or more of: (i) an instruction for one or more LED units of the plurality of LED units to prioritise use of the Fourth-colour LED over the Red, Green and Blue LEDs to substantially produce the colour and the brightness defined by received video data; (ii) an instruction for the one or more LED units of the plurality of LED units to prioritise use of the Red, Green and Blue LEDs over the Fourth-colour LED to substantially produce the colour and the brightness defined by received video data; and (iii) an instruction for the one or more LED units of the plurality of LED units to balance in a specific weighting the use of the Red, Green and Blue LEDs versus the Fourth-colour LED to substantially produce the colour and the brightness defined by received video data.

The fourth-colour LED may be white. The one or more representations of the spectral components of light to be, or being, emitted may relate to a pixel or a group of pixels of received video data. The one or more representations of the spectral components of light to be, or being, emitted may be spectral plots of the light. The spectral plots may be graphically presented as graphs of linear radiance with respect to wavelength.

The method may further comprise providing a user interface element as part of the user interface for a user to control the one or more spectral parameter control values. The one or more spectral parameter control values may be received responsive to a user viewing the representations of the spectral components of light on the user display. The method may further comprise receiving, from the user interface responsive to a user viewing the updated representation of the spectrum of light to be, or being, emitted, one or more updated spectral parameter control values indicative of a further variation of the spectral components.

Also disclosed is a non-transitory computer readable medium comprising computer-readable code arranged to implement any method disclosed herein. A system comprising one or more processors arranged to perform any method disclosed herein is also disclosed. The system may further comprise the user interface and the user display. The spectral parameter control values may be any spectral parameter control values disclosed herein. The system may further comprise the display panel.

A computer-implemented method for converting received Red-Green-Blue, RGB, video data into a Red-Green-Blue and a Fourth colour, RGBF, LED drive signal is disclosed. The method may comprise receiving RGB video data representative of a video comprising a plurality of frames. Each frame may comprise a plurality of pixels. For each pixel of each frame of the video, the RGB video data may define a red, a green and a blue brightness for representing a colour and a brightness of the pixel. The method may further comprise generating a RGBF LED drive signal from the received RGB video data. The RGBF LED drive signal may be configured for driving one or more LED modules comprising a plurality of LED units. Each LED unit may represent a pixel. Each LED unit may comprise a Red LED, a Green LED, a Blue LED, and a Fourth-colour LED that is not the same colour as the Red, Green or Blue LEDs. The generating may further comprise applying a control parameter to adjust a characteristic of the RGBF LED drive signal. This method enables more adaptive control of an LED panel. For example, characteristics of the colour and/or brightness can be better controlled.

The characteristic may be a spectral characteristic. The control parameter may vary the spectral characteristic by controlling relative brightness levels of two of more of the Red, the Green, the Blue, and/or the Fourth-colour LED. The control parameter may vary the spectral characteristic while maintaining the colour and the brightness of the pixel defined by the RGB video data. This allows a colour to be produced using different ratios of LEDs which in turn may improve control of the spectrum of light emitted.

A plurality of different combinations of brightness levels of the Red, the Green, the Blue LEDs, and the Fourth-colour LED that substantially produce the colour and the brightness for the respective pixel as defined by the received RGB video data when generating the RGBF drive signal may be available. The control parameter may enable selection of a single combination from the plurality of different combinations. The control parameter provides for a simple method for controlling a complex range of colour combinations.

The control parameter may be indicative of one of: (i) an instruction for one or more LED units of the plurality of LED units to prioritise use of the Fourth-colour LED over the Red, Green and Blue LEDs to substantially produce the colour and the brightness defined by the RGB video data; or (ii) an instruction for the one or more LED units of the plurality of LED units to prioritise use of the Red, Green and Blue LEDs over the Fourth-colour LED to substantially produce the colour and the brightness defined by the RGB video data; or (iii) an instruction for the one or more LED units of the plurality of LED units to balance in a specific weighting the use of the Red, Green and Blue LEDs versus the Fourth-colour LED to substantially produce the colour and the brightness defined by the RGB video data.

The control parameter may comprise or be derived from information indicative of one or more of: content of the video represented by the RGB video data; one or more objects to be illuminated by the one or more LED units; one or more characteristics of an image capture device; and one or more preferences of a user operating the image capture device.

When the control parameter comprises information indicative of one or more characteristics of the image capture device, the method may further comprise determining whether or not light emitted by the one or more LED units is to be directly captured by the image capture device. The method may further comprise producing the control parameter to prioritise use of: Fourth-colour LED over the Red, Green and Blue LEDs for producing the colour and brightness defined by the RGB video data, if light emitted by the one or more LED units are not to be directly captured by the image capture device; and the Red, Green and Blue LEDs over the Fourth-colour LED for producing the colour and brightness defined by the RGB video data, if light emitted by the one or more LED units are to be directly captured by the image capture device. This allows the light emitted by the LEDs to be selected to either be designed for being caught on camera, or for providing background lighting. Across a screen, some LEDs may be caught by camera while other LEDs may be providing background lighting. These roles may change as the camera moves.

The method may further comprise receiving information indicative of one or more of: a position, an orientation, a movement, or a field of view of the image capture device. The determining whether or not light emitted by the one or more LEDs is to be captured by the image capture device may be based on the received information.

The generating may further comprise determining whether a balance between use of (i) a combination of the Red, Green and Blue LEDs, and/or (ii) the Fourth-colour LED is capable of producing the colour and the brightness for the respective pixel. If the colour and the brightness cannot be produced, the balance may be adjusted between use of (i) a combination of the Red, Green and Blue LEDs, and/or (ii) the Fourth-colour LED, to substantially produce the colour and the brightness for the respective pixel.

When adjusting the balance between use of (i) a combination of the Red, Green and Blue LEDs, and/or (ii) the Fourth-colour LED, the balance may be adjusted by the least amount possible that enables the colour and the brightness for the respective pixel to substantially be produced.

The method may comprise determining a minimum drive signal for the Fourth-colour LED that achieves the colour and the brightness for the respective LED unit while minimising a drive level for the Fourth-colour LED. The method may also comprise determining a maximum drive signal for the Fourth-colour LED that achieves the colour and the brightness for the respective LED unit while maximising the drive level for the Fourth-colour LED. The minimum and maximum drive signals may define a range inclusive of the maximum and minimum. The method may comprise selecting the RGBF LED drive signal as a value from the range. The selecting may involve performing an interpolation between the minimum and maximum drive signals. The selecting may correspond to the control parameter.

The control parameter may be indicative of an adjustment corresponding to one or more of the Red, Green, Blue or Fourth-colour components of the RGBF drive signal. The adjustment may compensate for one or more characteristics of a non-standard observer viewing or recording an output of the one or more LED units. The characteristics may be variations to the perceived colour and/or brightness due to one or more characteristics of the observer.

The method may comprise driving an LED unit with a first RGBF LED drive signal. The method may further comprise driving the LED unit with a second RGBF drive signal. Or the method may comprise driving a second LED unit with the second RGBF LED drive signal. The method may further comprise observing the LED unit when driven by the first and second RGBF LED drive signals, or the LED unit and the second LED unit when driven by the first and second RGBF LED drive signals respectively. The method may also comprise determining the adjustment responsive to the observing of the LED unit, or the observing of the LED unit and the second LED unit, when driven by the first and second RGBF LED drive signals. The LED unit, or the LED unit and the second LED unit, may be observed by a human user via a screen forming an image from an image capture device monitoring the LED unit, or the LED unit and second LED unit, and the human user may provide an input via a user interface to vary the adjustment responsive to a comparison of the LED unit when driven by the first and second RGBF LED drive signals, or a comparison of the LED unit when driven by the first RGBF drive signal and the second LED unit when driven by the second RGBF LED drive signal. The LED unit, or the LED unit and the second LED unit, may be observed by a computing device using data captured by an image capture device monitoring the LED unit, or the LED unit and second LED unit. The computing device may vary the adjustment responsive to a comparison of the LED unit when driven by the first and second RGBF LED drive signals, or a comparison of the LED unit when driven by the first RGBF drive signal and the second LED unit when driven by the second RGBF LED drive signal.

The method may further comprise driving an LED unit with a first RGBF LED drive signal. The method may also further comprise driving the LED unit with a second RGBF LED drive signal. The method may also further comprise observing the LED unit when driven by the first and second RGBF LED drive signals. The method may further comprise determining the adjustment responsive to the observing of the LED unit when driven by the first and second RGBF LED drive signals. The balance of the different LEDs may therefore be improved. In another arrangement, the first RGBF LED drive signal may drive a first LED unit, while the second RGBF LED drive signal may drive a second LED unit. Hence, rather than sequentially driving the same pixel in two different ways, two different pixels may be driven simultaneously.

The LED unit, when driven by the first and second RGBF LED drive signals, may be observed by a human user. This may be via a screen forming an image from an image capture device monitoring the LED unit. The human user may provide an input via a user interface to vary the adjustment responsive to a comparison of the LED unit when driven by the first and second RGBF LED drive signals.

The LED unit, when driven by the first and second RGBF LED drive signals, may be observed by a computing device. The computer device may use data captured by an image capture device monitoring the LED unit. The computing device may vary the adjustment responsive to a comparison of the LED unit when driven by the first and second RGBF LED drive signals. The computing device may vary the adjustment via an iterative process.

The control parameter may define a maximum increase in brightness to be applied to one or more LED units of the plurality of LED units represented in the RGBF LED drive signal when compared to a maximum brightness that would otherwise be achievable if the LED unit only comprised a Red LED, a Green LED and a Blue LED.

The generating the RGBF LED drive signal may further comprise increasing the brightness of the one or more LED units represented in the drive signal based on the control parameter. The brightness of the one or more LED units may be increased by combining the Red, Green and Blue LEDs with the Fourth-colour LED while still substantially producing the colour defined by the RGB video data. If a resulting brightness represented in the RGBF LED drive signal exceeds an achievable brightness level of the RGBF LEDs of the one or more LED units, the brightness in the RGBF LED drive signal may be set at a substantially maximum achievable brightness that enables the colour of the respective pixel in the received RGB video data to be substantially achieved.

Improved control of brightness may be achievable via some of the methods disclosed herein.

The fourth-colour LED may be a white LED. The method may further comprise a fifth LED, wherein the fourth and fifth LEDs are selected from: white, cool white, warm white, lime, cyan, indigo, yellow, amber and magenta. The control parameter may change in real-time. The control parameter may change per frame and/or per pixel. The control parameter may be adjustable by a user via one or more graphical user interface elements. The generating may further comprise considering calibration data. The calibration data may be one or more of per-pixel calibration data, per-area calibration data, and RGBF calibration data. The control parameter may be used to adjust the calibration data.

A computer program product comprising computer-readable code arranged to implement any method disclosed herein is disclosed. The computer program product may be transitory or non-transitory.

A system is disclosed comprising one or more processors arranged to perform any method disclosed herein. The one or more processors of the system may comprise at least one central processor. The one or more processors of the system may comprise a plurality of distributed processors. Each distributed processor may be associated with one or more LED units of the plurality of LED units. Any method disclosed herein may be performed by the plurality of distributed processors and the at least one central processor may distribute the RGB video data to be processed to the plurality of distributed processors.

The system may further comprise an array of LED modules, each LED module may comprise one or more LED drivers in addition to a plurality of RGBF LED units, each RGBF LED unit may comprise a Red LED, a Green LED, a Blue LED and a Fourth-colour LED.

A computer-implemented method is disclosed for providing a preference between use of Red-Green-Blue components compared to a Fourth-colour component when converting received Red-Green-Blue, RGB, video data into a Red-Green-Blue and a Fourth colour, RGBF, LED drive signal. The method may comprise receiving RGB video data representative of a video comprising a plurality of frames. Each frame may comprise a plurality of pixels. For each pixel of each frame of the video, the RGB video data may define a red, a green and a blue brightness for representing a colour having a brightness. The method may further comprise generating an RGBF LED drive signal from the received RGB video data, wherein the RGBF LED drive signal may be configured for driving one or more LED modules comprising a plurality of LED units. Each LED unit may represent a pixel and comprise a red LED, a green LED, a blue LED, and a fourth-colour LED that is not the same colour as the red, green or blue LEDs. The generating may further comprise balancing between brightness levels of (i) a combination of the Red, Green, and Blue LEDs, and/or (ii) the fourth colour LED while producing the colour and the brightness for the respective pixel as defined by the received RGB video data.

Alternatively, in a computer-implemented method for adjusting colour characteristics of a video when viewed by a non-standard observer, the generating may further comprise adjusting one or more of the Red, Green, Blue or Fourth-colour components of the RGBF drive signal. Such an adjustment may compensate for one or more characteristics of a non-standard observer which may be viewing or recording an output of the one or more LED units.

In another alternative computer-implemented method for boosting a brightness of one or more aspects of a video displayed on one or more LED units, the generating may further comprise permitting a brightness boost. The brightness boost may increase a brightness of a pixel represented in the RGBF LED drive signal from the brightness of an equivalent pixel of the plurality of pixels in the RGB video data.

Also disclosed is a method for varying spectral characteristics of light emitted by an LED unit. The method may comprise determining a preference between prioritising the spectral characteristics of one or more of a red LED, a green LED and a blue LED compared to the spectral characteristics of a fourth emitter to produce or substantially produce a colour. The preference may be determined based on whether or not the light emitted by the LED unit is to be directly captured by an image capture device. Alternatively, the preference may be determined based on whether or not the light emitted by the LED unit is to be captured reflecting off one or more objects. One or more of a field of view, a position, a movement or an orientation of the image capture device may form part of the determination.

Also disclosed is a method for adjusting the spectral characteristics of light emitted by an LED unit to adjust for how the LED unit is perceived by an image capture device. The LED unit may comprise a Red LED, a Green LED, a Blue LED and a Fourth-colour LED. The method may further comprise adjusting one of the Red, Green, Blue or Fourth-colour LEDs. The adjusting may be performed responsive to how the brightness and/or colour is perceived at the image capture device. The method may further comprise correcting how the brightness and/or colour is perceived at the image capture device by providing adjustment of the spectral characteristics, and capturing the adjusted perceived brightness and/or colour. The captured adjusted perceived brightness and/or colour may be compared by a computer or a human. When compared by a human, the adjusted perceived brightness and/or colour captured by the image capture device may be displayed on a screen.

Also disclosed is a method for increasing a brightness of one or more portions or components of an LED panel. The method may comprise receiving an indication of a desired maximum brightness. The indication may be for one or more portions or components of the LED panel. The method then further comprises adjusting a brightness of the one or more portions or components of one or more drive signals driving the equivalent one or more portions of components of the LED panel.

Another method for boosting the brightness of one or more portions or components of an LED panel is disclosed. The LED panel uses a Red LED, a Green LED, a Blue LED and a Fourth-colour LED, wherein the Fourth-colour LED is a different colour to the other LEDs. The method comprises increasing the brightness of one or more portions, components or pixels of the LED panel by using a combination of the Red, Green, Blue and Fourth-colour LED to produce a desired output colour. The method may involve receiving an indication from a user of a desired increase in brightness. The desired increase in brightness may set a maximum possible increase in brightness. The method may further comprise determining a brightness increase that is possible given the desired output colour taking into account the maximum increase in brightness.

BRIEF DESCRIPTION OF THE DRAWINGS

Exemplary arrangements of the disclosure shall now be described with reference to the drawings in which.

Throughout the description and the drawings, like reference numerals refer to like parts.

SPECIFIC DESCRIPTION

Figure 1:
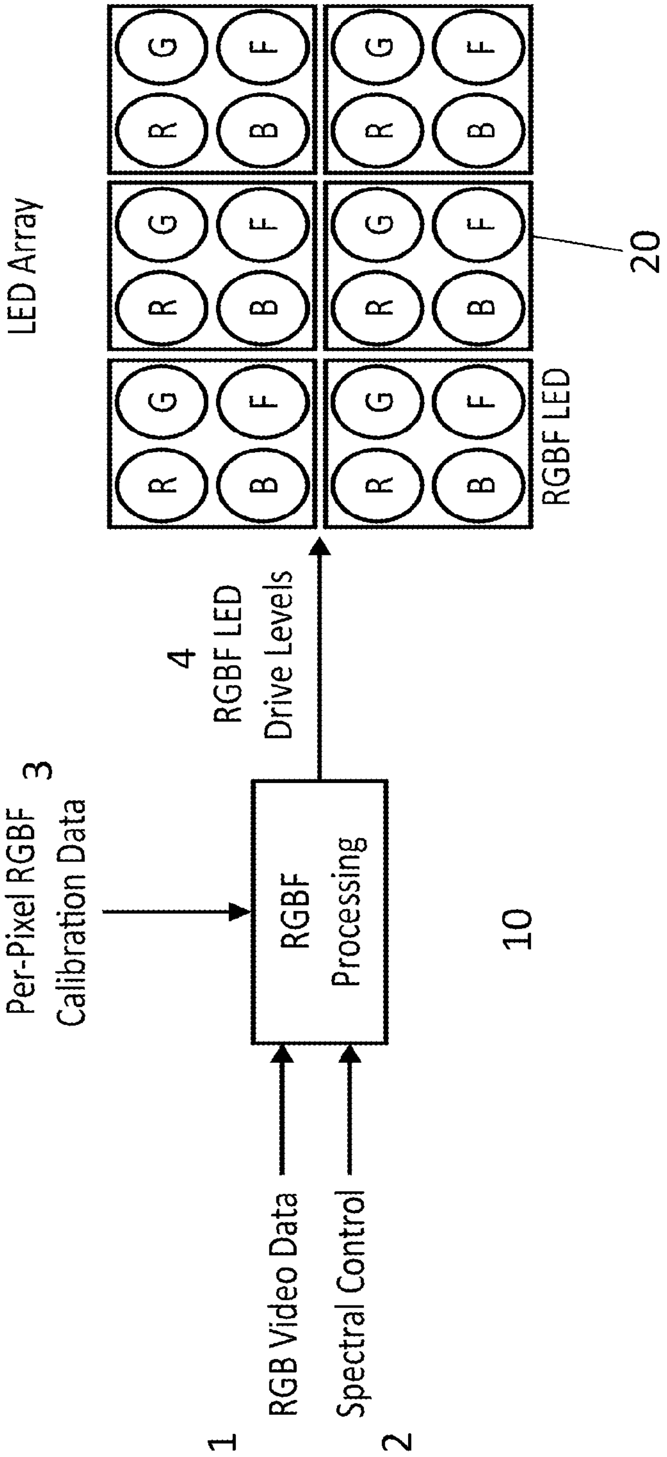
FIG. 1 illustrates an RGBF LED array along with associated processing device.

It has been identified that the many technical problems and flaws associated with using RGB LED panels in the film and television production environment can be substantially reduced or eliminated by the addition of an additional non-RGB emitter, such as a white emitter with a much broader spectral output. Alternatively, a narrowband emitter such as amber or cyan might be selected to help 'fill in' the gaps in the spectral output. Consequently, throughout this disclosure reference is made to such a system as 'RGBF', with the 'F' standing for the 'Fourth' channel, which might be white or indeed any other colour. Indeed, in some arrangements, further emitters could also be incorporated to provide a broader spectral coverage from the emitters so 'F' can also be considered one or more Further emitters.

Regardless of the exact choice of fourth emitter, its addition introduces some problems that must be overcome. These problems are not known but have instead first been identified herein. Hence, this disclosure not only relates to the introduction of a fourth emitter but provides solutions to problems associated with adding a fourth emitter. In turn, improved methods and systems are disclosed for controlling such LED panels in ways that improve the use of such panels in a wide range of commercial use cases, including film and television production.

One technical difficulty with having a fourth emitter is that the calibration of the system must be maintained, such that using the fourth emitter doesn't reduce the achievable colour accuracy of the output (e.g. when measuring the CIE XYZ colour coordinates of the output). In addition, even if the same CIE colour point is achieved, viewing the screen using a 'non-standard' viewer such as a camera may result in a different colour being observed, depending on how much the spectral sensitivity of the viewer deviates from the CIE's standard observer colour matching functions (from which XYZ colours are derived). This change in observed colour is undesirable and is preferably compensated for.

For a conventional RGB system, the three channel (RGB) video input signal ultimately translates into a single set of RGB LED drive levels. These drive levels may take the form of a drive signal or plurality of drive signals. It will be appreciated that a plurality of drive signals, for each LED, could be provided, or a single drive signal with multiple component for driving each LED could be provided. There is only ever one correct solution to this translation, so existing systems are performing a simple mapping from the video input signal to the RGB drive levels. However, with a three channel (RGB) video input signal and a four channel (RGBF) output, the choice of output levels is an under-constrained problem. That is, there are many sets of RGBF drive levels ("metameric mixes") that may produce the same perceived output colour. For example, if the fourth emitter is a white LED, then white output might be achieved by 100% Red, 100% Green, 100% Blue and 0% White, or it could equally be achieved by 50% Red, 50% Green, 50% Blue and 50% White, or alternatively 0% Red, 0% Green, 0% Blue and 100% White. Different metameric mixes achieve the same colour output, but with different spectral content. The optimal choice of mix will depend on a range of factors including the video content, the objects to be illuminated (if any), the viewing device and the user's preferences. So, there is no single choice that will always yield the optimal mix for the four outputs. While this example focuses on the specific case of RGBW with the fourth emitter being white, the same problem applies for any colour of fourth emitter, and for a larger number of emitters. A high quality RGBF video display system must therefore additionally determine the optimal metameric mix based on these additional factors.

Finally, the addition of a fourth emitter permits the system to achieve brighter output for some colours than would have been possible without the fourth emitter. For example, an RGBW panel could output 100% Red, 100% Green, 100% Blue and 100% White to produce white light at twice the brightness of an equivalent RGB-only panel. In some situations, this will be appealing (e.g. for lighting purposes seeking maximum achievable brightness), but for a video display device it conflicts with the video signal's colour space definition, which requires that peak white output is equal to the sum of peak red, peak green and peak blue output. Ignoring this imbalance and always displaying the brightest possible output results in images where some areas of the image (such as pale colours for an RGBW panel) are rendered brighter than expected, while other areas of the image (such as very saturated colours for an RGBW panel) are rendered darker than expected, resulting in extremely poor overall image quality.

FIG. 1 illustrates a simplified schematic representation of a RGBF-based video display system. In this system, RGB video data 1 to be displayed is received at an RGBF processing unit 10. The RGB video data comprises a plurality of frames of video data, each frame represented by a plurality of pixels. Each pixel has an associated red, green and blue brightness level. In some arrangements, compression techniques may be used to reduce the repetition of data per frame or per pixel over multiple frames. In addition, the RGBF processing unit 10 receives spectral control data 2 (sometimes referred to as spectral control settings), and per-pixel RGBF calibration data 3, which calibrates the LEDs to compensate the drive levels output by the RGBF processing unit 10 for the specific performance of each LED. The spectral control data 2, also referred to as a control parameter, may control aspects of the spectral content such as aspects of colour and brightness as will be discussed in more detail. The calibration data 3 may contain information pertaining to the brightness and/or colour of the LEDs'. It will be appreciated that the calibration data 3 may contain direct measurements (e.g. the LED has a brightness of 1250 Nits) as well as derived values (e.g. a need to drive the LED at 80% to achieve the target brightness). Furthermore, it will be appreciated that the derived values for the calibration data 3 may not directly imply the actual brightness (or colour), especially if the target value isn't known. However, the calibration data 3 may have been derived from knowing something about the brightness (or colour), even if it was only a relative (rather than absolute) measurement. It will be appreciated that RGBF calibration data contains information pertaining to the brightness and/or colour of each of the R, G, B and F LEDs. The RGBF processing unit 10 translates the input RGB video data 1 into RGBF data to be output, whilst also applying the spectral control data 2 and calibration data 3 to the input RGB video data 1. The RGBF processing unit 10 then outputs RGBF LED drive levels 4, which are sent to LED array 20. The RGBF LED drive levels 4 may be a drive signal or a plurality of drive signals. LED array 20 comprises an array of a number of RGBF LED modules as depicted in FIG. 1 and discussed in more detail in FIG. 19. The multiple emitter colours, which form a single LED unit, may be contained within a single LED package, or subsets of the emitters may be in separate packages, or multiple pixels of multiple emitter colours may be contained within a single package.

The RGBF processing unit 10 could support any fourth-colour emitter, maintain calibrated colour accuracy when viewed by eye or by camera, and offer real-time control over the metameric mix for each pixel. It will now be discussed how each of these technical advantages is achieved in the RGBF processing system disclosed herein.

In order to determine how to convert RGB video data into RGBF LED drive levels, parameters need to be considered that can be user or automatically controlled. As such, these parameters can be based on the specific application, or even current factors relating to the specific timing within the application. Such parameters may be referred to as a control parameter or control parameters. The approach disclosed herein therefore obtains one or more control parameters to inform the conversion of incoming RGB video data to the appropriate RGBF LED drive levels. These parameters may change in real-time or remain static, either per-frame or even per-pixel, depending on user requirements. Furthermore, the one or more control parameters may be representative of a spectral parameter, a purpose of which may be to adjust the spectral content of the light emitted from the RGBF LEDs in a way that cannot be described by an RGB video signal alone. A control parameter may identify a preferred balance between emitters, or identify a prioritisation of certain emitters over others. While various parameters are disclosed individually, it will be appreciated that they can be combined within a more complex implementation. In summary, the spectral control data parameters considered herein are:

- Spectral Preference—a parameter that indicates how desirable it is to use the fourth emitter, or further additional emitters, rather than just RGB.
- Spectral Boost—a parameter that indicates how much (if any) additional brightness to provide as a result of using four or more emitters rather than three.
- Spectral Balance—a parameter that indicates how to adjust the RGBF drive levels to maintain colour accuracy when using the fourth or further emitters and the screen is viewed by a non-standard, or non-human, observer such as a camera, or other optical detection device.

Each of these parameters affects a characteristic of the LED drive signal that drives the LED to produce the emitted light. More specifically, but not exclusively, each of these characteristics is a spectral characteristic. Hence, each characteristic will vary an aspect of the spectrum of light. Some vary the spectrum to increase brightness without varying the colour. Some vary the spectrum to change spectral aspects (such as energy distribution across the spectrum) of the colour without changing perceived aspects of the colour. The operation of each of these control parameters shall now be described in detail.

Spectral Preference

As mentioned above, spectral preference is a parameter that indicates whether or not to use the fourth emitter, or further additional emitters, rather than just RGB, or an extent to which the fourth or further emitters should be used alongside RGB. Spectral preference may therefore be considered a way of prioritising use of certain emitters to achieve a desired output. Spectral preference may also be considered a way of balancing each emitter to achieve the desired output. This parameter shall now be discussed in detail. For simplicity of explanation it is noted that the following description only describes the use of a fourth emitter, however it will be appreciated that further emitters may also be incorporated into alternative implementations.

Figure 2:
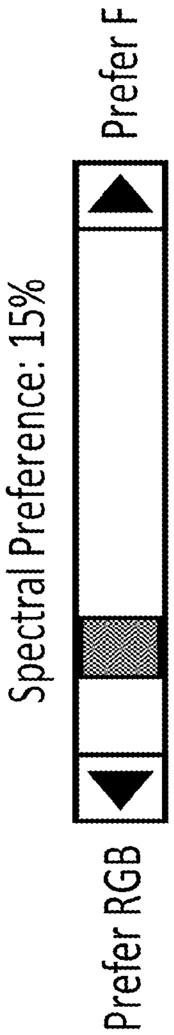
FIG. 2 illustrates a GUI slider used to control a spectral preference.

For any given colour and brightness specified by a pixel in the RGB video input, there may be multiple metameric mixes using the four output emitters that can achieve the requested colour and brightness. The spectral preference input consists of a value between 0% (to prefer RGB) and 100% (to prefer F), which may be different for each pixel. As shown in FIG. 2, a graphical user interface element may be provided to enable user control of the spectral preference by means of a slider. Referring to FIG. 2, the user can manually adjust the slider graphical user interface element between 0% (to prefer RGB) and 100% (to prefer F). It will be appreciated that other forms of user interface element may be provided to provide the desired functionality, from rotational movement elements to numerical data entry. Furthermore, while the spectral preference input could be controlled, e.g. by the slider of FIG. 2, on a pixel basis, the slider could also set the spectral preference for the entire screen, a panel, a group of panels, or a group of pixels. In addition, while a scale of 0-100% is provided, it will be appreciated that any suitable scale could be used.

A value close to 0% (prefer RGB) may be appropriate for situations where the LEDs aren't providing lighting, as this maintains similar performance to a traditional RGB-only panel (for example, avoiding any unexpected colour shifts if viewed by a camera). A value close to 100% (prefer F) may be appropriate when a broader spectral output from the panel is required, such as when used to provide lighting. Any value between these two may be selected to achieve an intermediate level of performance for situations where predictable behaviour on camera and broader spectral output are both desirable.

Figure 3:
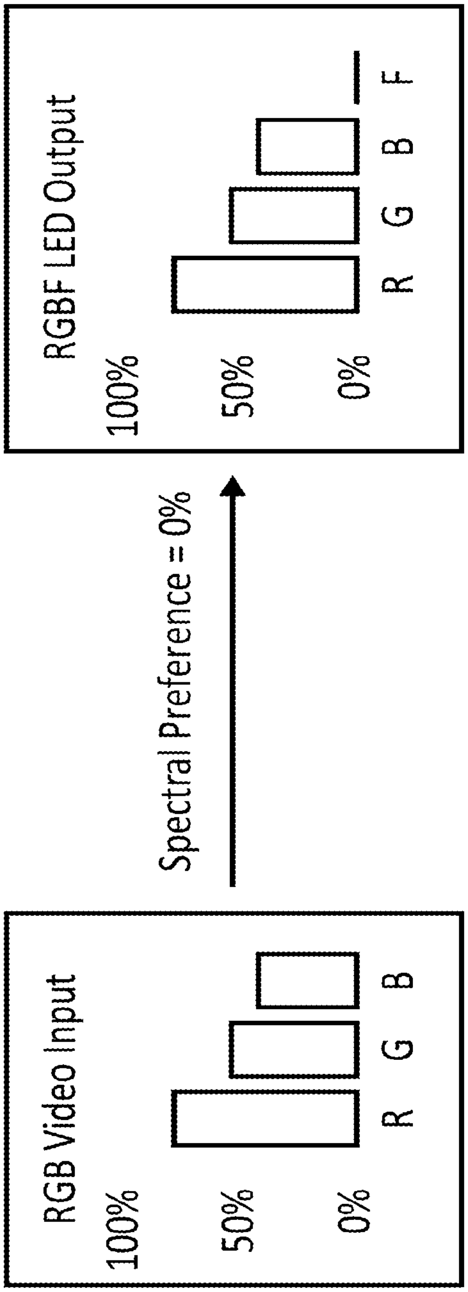
FIG. 3 illustrates a first example of converting an RGB video input into an RGBF LED output incorporating spectral preference.

For example, as illustrated in FIG. 3, if the fourth colour F is white, a regular RGB video signal may require a pixel to show a pale orange colour. With the spectral preference at 0% (prefer RGB), this RGB signal can be passed through unaffected (calibration notwithstanding) to just the RGB emitters of the pixel, as this achieves the desired output without using the F emitter at all.

Figure 4:
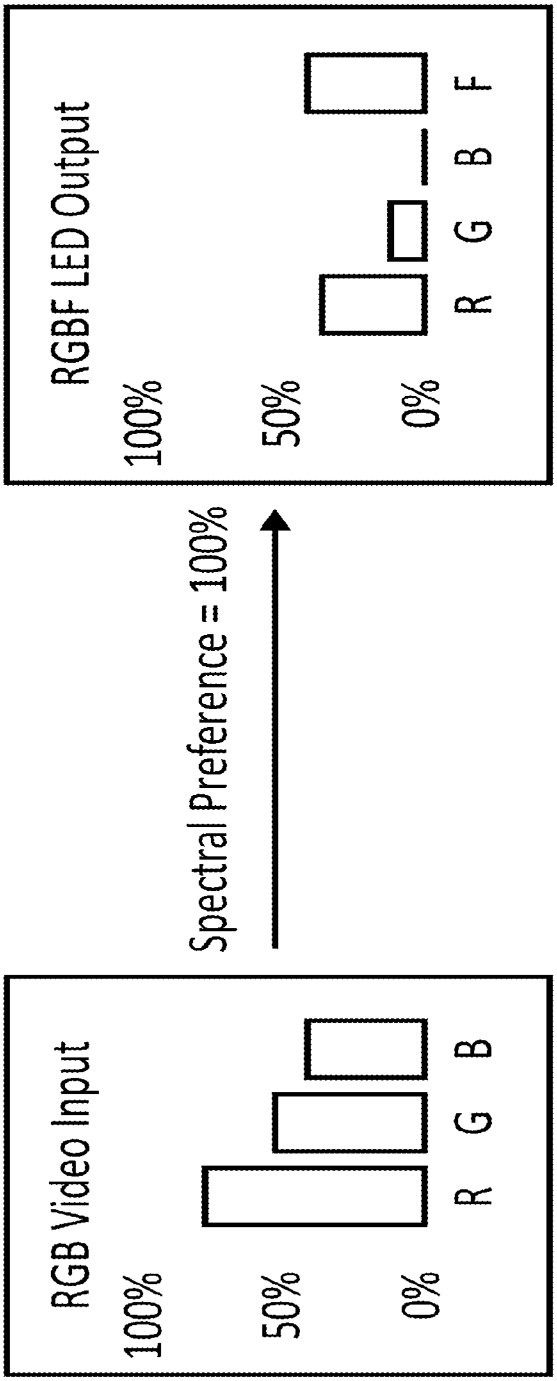
FIG. 4 illustrates a second example of converting an RGB video input into an RGBF LED output incorporating spectral preference.

At the other extreme of spectral preference, as illustrated in FIG. 4, the video processor would add as much of the fourth, white emitter, as possible and adjust the levels of the RGB emitters accordingly such that the same pale orange colour was produced, but with as much of the broad-spectrum white emitter as possible and as little of the other, narrow-spectrum RGB emitters as possible.

Figure 5:
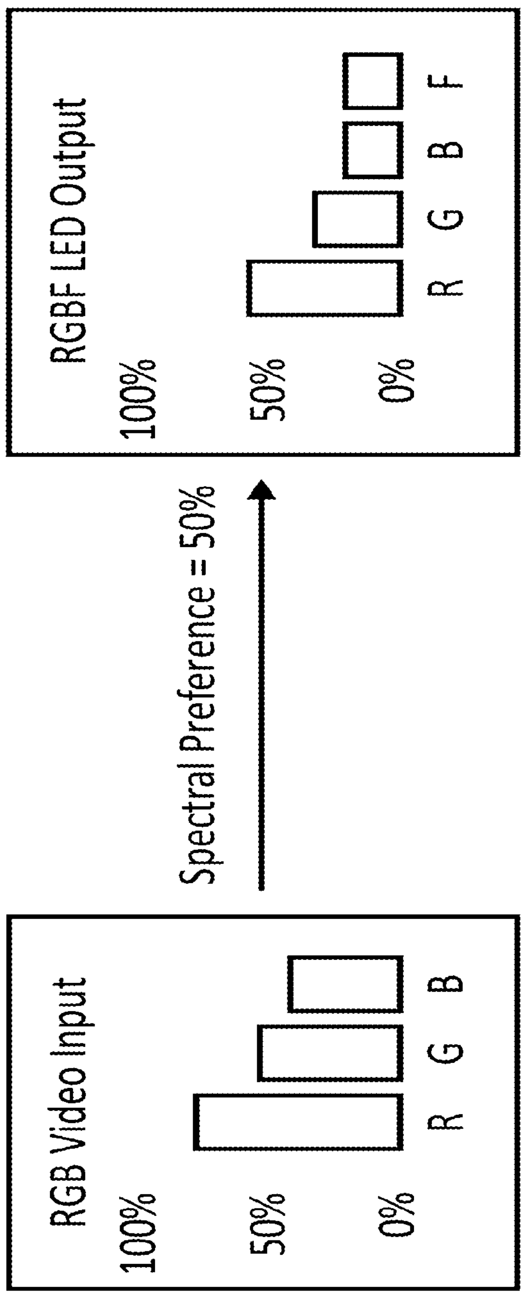
FIG. 5 illustrates a third example of converting an RGB video input into an RGBF LED output incorporating spectral preference.

As a compromise, with spectral preference at 50%, the F emitter should be used, but at a reduced level and therefore requiring slightly more R, G and B. This is illustrated in FIG. 5. It will be appreciated that the values given for the spectral preference signal here are purely exemplary and do not in any way limit how the signal should be formatted.

Outside of this specific example, the choice of the fourth colour F is arbitrary and no simple assumption is made, as in the prior art, that R+G+B=W. Instead, a full analysis of the four colours of the emitters, the desired target colour from the RGB video signal, and the spectral preference signal must be made to calculate the required metameric mix of the four emitters. This process is repeated individually for each pixel in the video display screen. In some embodiments this process is repeated for every frame of the incoming video at full video rate.

The requested colour from the video input may be outside the gamut achievable using only the red, green and blue emitters. This may be because the video input's colour space is wider than the RGB LED's achievable gamut, or because one or more of the video input levels are negative, indicating a colour outside of the input's RGB-only gamut. If the fourth colour F is inside the gamut of the red, green and blue LEDs (such as a white fourth emitter) then the overall achievable colour gamut has not been enlarged by the addition of the fourth emitter. In this instance, existing methods (for example clipping negative video levels to zero) will be required to bring the colour back in-gamut.

However, if the fourth colour F is outside the gamut of the red, green and blue LEDs (such as for other narrow-spectrum emitters including, but not limited to, cyan), the requested out-of-RGB-gamut colour may be achievable but only by using the fourth emitter. In this case, the spectral preference may have to be partially or completely ignored by the system to achieve the requested output colour (hence it's a preference rather than a requirement). In this case, a spectral preference of 0% would employ the minimum (but non-zero) amount of the fourth emitter necessary to be able to achieve the requested colour, while a spectral preference of 100% would add as much of the fourth emitter as possible while still achieving the requested colour. In some cases, the minimum amount and maximum amount of the fourth emitter may be the same (for example, if the requested colour exactly matches the colour of the out-of-RGB-gamut fourth emitter, such that adding any red, green or blue would shift the colour output away from the desired colour), in which case the setting of the spectral preference control will have no bearing on the RGBF drive levels for this pixel displaying this particular colour. In some cases, a subset of the pixels may feature fourth colour emitters that are within the RGB gamut, while a different subset may feature fourth colour emitters that are outside of the RGB gamut, with the system required to support both cases. In other words, if the spectral preference dictates that the RGB LEDs are preferred, but the required colour is only achieved with use of the fourth LED, a minimal amount of the fourth LED will be used.

Figure 6:
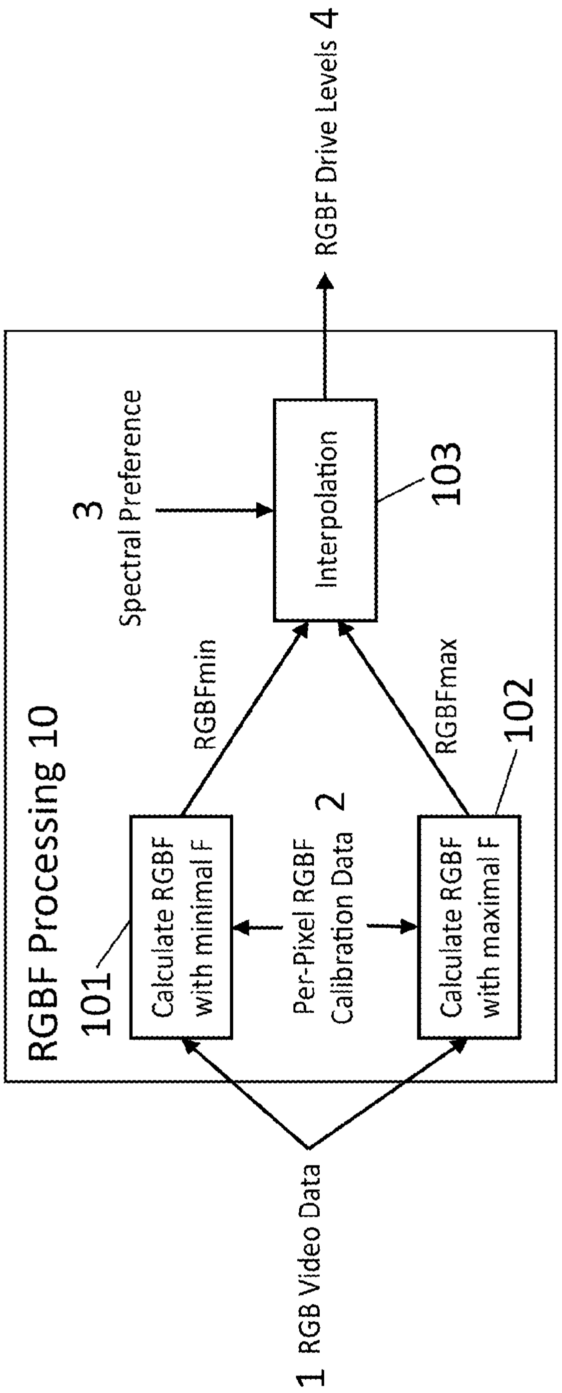
FIG. 6 illustrates an RGBF processing unit for incorporating spectral preference when generating RGBF drive levels.

To implement the above behaviour, the functional components of the RGBF processing unit 10 depicted in FIG. 6 are deployed. Each pixel of incoming RGB video data 1 is used to calculate a (non-negative) RGBFmin (the RGBF output that achieves the requested colour and brightness while minimising the F drive level) at computational unit 101, taking into account the per-pixel RGBF calibration data 2 to ensure the colorimetric accuracy of the solution. Similarly, each pixel of incoming RGB video data 1 is also used to calculate (non-negative) RGBFmax (the RGBF output that achieves the requested colour and brightness while maximising the F drive level) at computational unit 102. The per-pixel RGBF calibration data 2 may be taken into account to ensure the colorimetric accuracy of the solution. The spectral preference control input 3 is then used to inform an interpolation (e.g. linear interpolation) at computational unit 103 between the two possible solutions, resulting in the final RGBF drive levels. Other methods may be used to determine the final RGBF drive levels from the maximum and minimum.

The RGB video data 1, RGBF calibration data 2 and spectral preference 3 may vary from one pixel to the next. This results in significantly higher computational complexity compared to a rudimentary 2D, 2.5D or 3D LUT-based implementation, but offers dynamic per-pixel control and colour accuracy that such a LUT-based implementation is unable to deliver. The quality of the light finally output by the LED panel is therefore dramatically improved.

Figure 7:
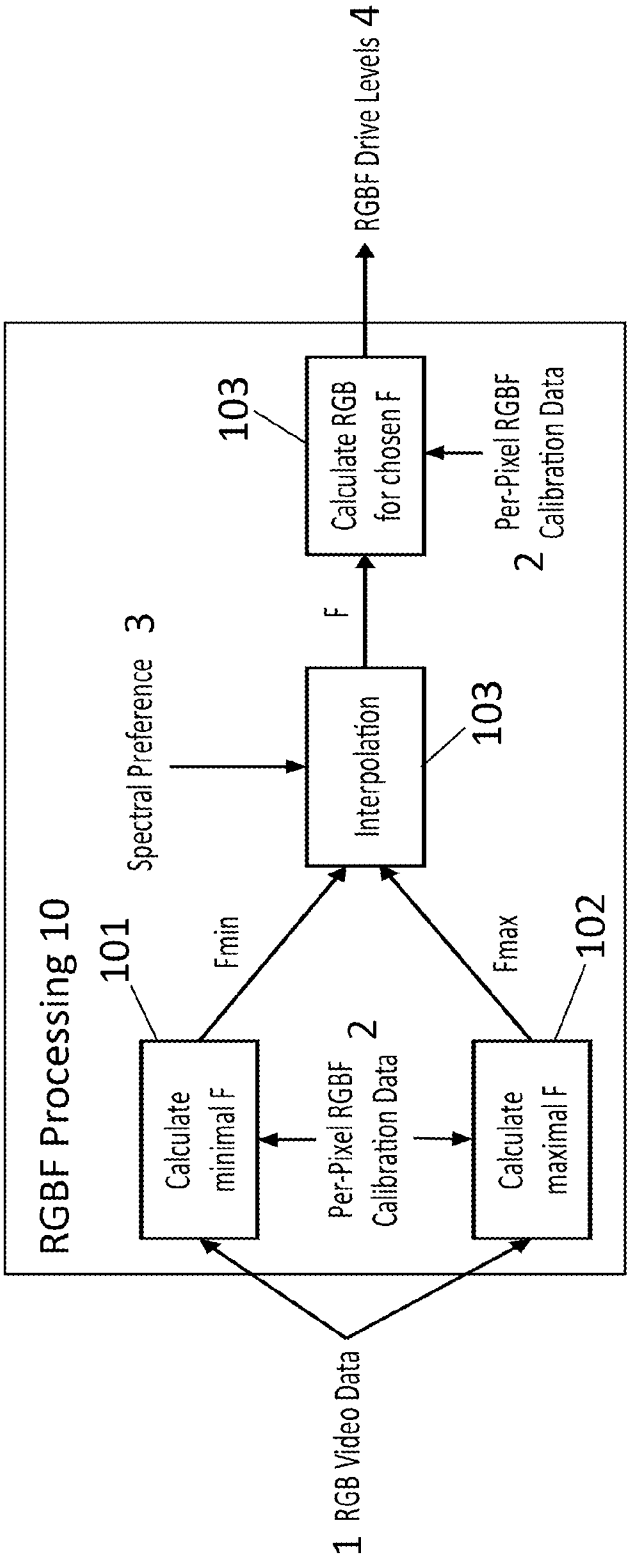
FIG. 7 illustrates an alternative RGBF processing unit for incorporating spectral preference when generating RGBF drive levels.

A possible improvement of the above approach calculates only the minimum and maximum (non-negative) F drive levels (excluding R, G and B drive levels), then interpolates between these two F values, only later calculating the necessary RGB drive levels for the final, interpolated F value as shown in FIG. 7. As can be seen, the output of the interpolation computational unit 103 is then input into the computational unit 104 that calculates the RGB for the chosen F based on the per-pixel calibration data 2. Using this approach that only considers the F drive levels rather than the RGBF drive levels provides similar functionality with a reduced computational burden.

In other arrangements, the spectral preference may be automatically set and varied based on further inputs. For example, the spectral preference may be set based on camera field of view data, panel locations, input video pixel content or by use of a mechanism to analyse and differentiate between multiple areas of the image video pixel content, such as a key, mask, material ID or object ID signal.

While a maximum and minimum RGBF signal are discussed above, it will be appreciated that a similar functionality could be achieved by any two data points. By taking a maximum and minimum, a maximum range is used, which in turn improves the quality of the final result. It will be appreciated that maximum may refer to an upper data point, while minimum may refer to a lower data point. Furthermore, the terms maximum and minimum need not be an absolute maximum and absolute minimum, but instead a selected maximum and a selected minimum for the purposes of this processing.

When the LED unit comprises more than four emitters, a single spectral control could still be provided. Such a spectral control may have an implied equal preference for all additional emitters. Alternatively, there may be a plurality of spectral preference controls, each for a subset of the further emitters. For example, a panel with both warm white and cool white LEDs might have two separate spectral preference sliders, one for 'Prefer RGB↔Prefer White', and one for 'Prefer Warm White↔Prefer Cool White'. Multiple RGB to RGBF conversions could then be performed, with multiple interpolations then used to mix between these potential outputs.

Per-pixel RGBF calibration data may typically independently describe the performance of each independent LED pixel. However, for the benefit of reduced processing complexity or reduced data size, the granularity of the RGBF calibration data may alternatively be made 'coarser' by describing the performance of multiple LED pixels together. For example, grouping pixels into pairs to halve the data size by storing per-pair RGBF calibration data, or grouping all the pixels within a rectangular area of the display to produce per-area RGBF calibration data. In these cases, the same RGBF calibration data is applied to all pixels within each pair or area.

Spectral Boost

As mentioned previously, spectral boost is a parameter that indicates how much (if any) additional brightness to provide as a result of using four emitters rather than three. In other words, spectral boost may be referred to as a brightness increasing factor, or a brightness boost, or brightness amplifier. Spectral boost is also referred to as spectral headroom. This parameter will now be discussed in detail.

For simplicity of explanation it is noted that the following description only describes the use of a fourth emitter, however it will be appreciated that further emitters may also be incorporated into alternative implementations.

Pixels of incoming RGB video data may describe brightness levels that exceed the capabilities of any given display. For example, High Dynamic Range content in PQ (Perceptual Quantizer) format may contain pixels of brightness up to 10,000 Nits, whereas LED panels typically offer a lower achievable brightness. For example, a usual brightness of LED panels is 500-2000 Nits for indoor application and 4000-8000 Nits for outdoor applications. In addition, other adjustments within the LED processing pipeline may increase any incoming levels to higher brightness, again exceeding the achievable brightness of the display.

The addition of a fourth emitter may afford the display additional brightness, at least for some areas of the colour gamut. For example, the addition of a white LED would permit pale colours to be achieved at a higher brightness by utilising the white LED in addition to the red, green and blue LEDs. Similarly, the addition of a cyan LED would permit colours close to cyan to be achieved at a higher brightness by utilising the cyan LED in addition to the green and blue LEDs. The spectral boost input consists of a value between ×1 (no boost) and some higher limit such as ×5 (to permit brightness five times higher), which may be different for each pixel.

Figure 8:
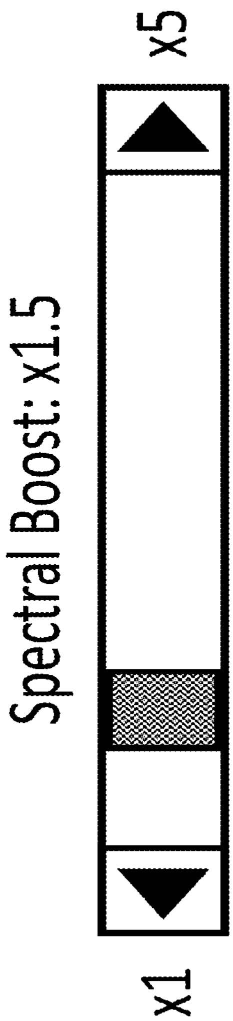
FIG. 8 illustrates a GUI slider used to control a spectral boost.

The spectral boost may be operated via a graphical user interface element implemented in software in the form of a slider as shown in FIG. 8. A user is then able to move the slider from the minimum spectral boost, in this case ×1, up to the maximum achievable spectral boost, in this case ×5. It will be appreciated that a variety of other user controls could be provided to adjust this parameter and the slider is illustrative of one way of achieving this functionality.

A spectral boost value of ×1 (no boost) may be appropriate if the brightness of the four-emitter RGBF display is intended to perform similarly to the brightness of a standard three-emitter RGB display. This has the benefit of maintaining the technically correct brightness relationship between red, green, blue and white (and indeed all other possible colours) as is conventionally expected for an RGB video display accepting an RGB video signal. So the brightness levels across the image will look correct when comparing areas of the image with different colours and saturations. A substantially higher spectral boost value may be preferred if the output brightness of the RGBF display is paramount, perhaps because it is casting light on foreground objects, provided it is acceptable to relax the technically correct relationship between the maximum brightness of each colour. This might be the case with High Dynamic Range (HDR) video content where often the vast majority of the pixels are at a substantially lower brightness level (maybe a few hundred Nits) and only a small proportion of the pixels are at extreme brightness levels (such as a few thousand Nits) to represent extremely bright objects such as the sun, fire, a lightbulb or specular highlights. In each of these cases, the extremely bright objects are often relatively pale colours (it is unusual in most content for a pixel to be both extremely bright and extremely saturated), which means that it's acceptable to relax the relationship between the maximum brightness of each colour, as more saturated colours (where an RGBW screen can only achieve lower brightness) are only ever required to be displayed at lower brightness, whereas paler colours (where the RGBW screen can achieve disproportionately higher brightness by using all four emitters simultaneously) usefully benefit from being able to achieve a disproportionately higher brightness.

Figure 9:
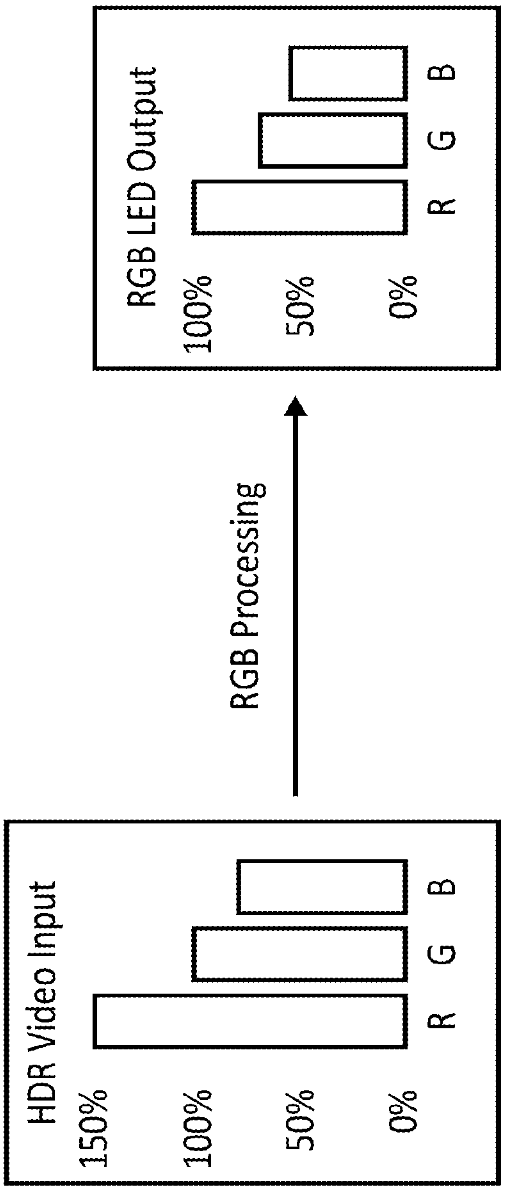
FIG. 9 illustrates an example of converting an HDR RGB video input into an RGB LED output.

For example, as illustrated in FIG. 9, an HDR RGB video signal may describe a pixel of pale orange colour and particularly high brightness, exceeding the achievable brightness of an RGB panel. In this case, the expected behaviour might be for the RGB panel to cap the brightness of the pixel to the maximum it can achieve, while maintaining the same colour point. Note that this maximum brightness has at least one of the three output channels at the maximum brightness of 100%.

Figure 10:
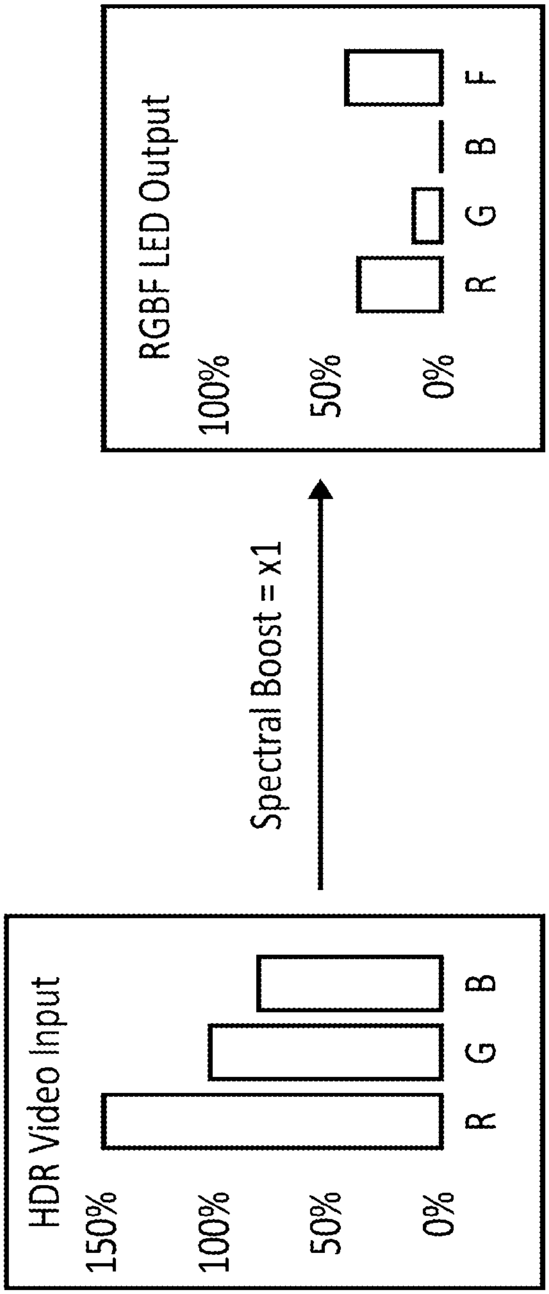
FIG. 10 illustrates a first example of converting an HDR RGB video input into an RGBF LED output incorporating spectral boost.

With an RGBF panel where the spectral boost is set to ×1 (no boost), the panel may achieve the desired colour any number of ways (depending on the spectral preference), but in all cases the brightness should match that achievable on an RGB panel. For example, as illustrated in FIG. 10, if the fourth emitter is white, the RGB drive levels may be reduced substantially and the F drive level increased to achieve the exact same output colour and brightness as the RGB panel.

Figure 11:
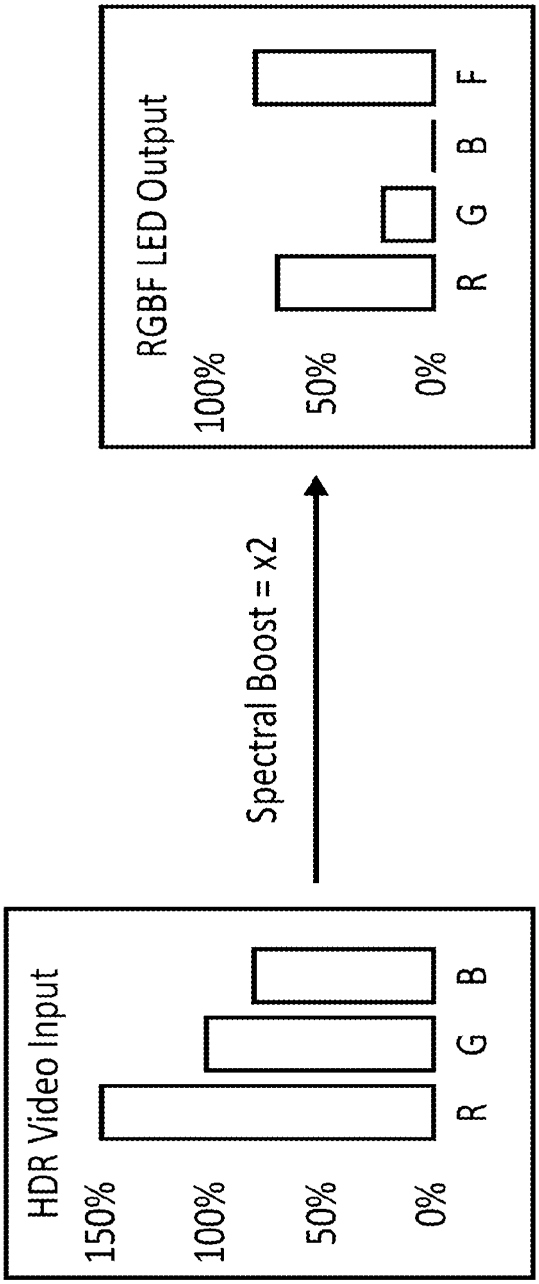
FIG. 11 illustrates a second example of converting an HDR RGB video input into an RGBF LED output incorporating spectral boost.

Note that in this case none of the output drive levels are at 100%, so there is considerable potential available to achieve brighter output. Therefore, if the spectral boost is set to a higher value such as ×2, the drive levels can be increased to achieve the same colour at a higher brightness than was possible with the RGB-only panel. In FIG. 11, where the maximum video input level is 150%, any spectral boost value of ×1.5 or higher would achieve the same result, as the spectral boost effectively sets a limit on how bright the output is permitted to get, so if the input 'only' demands a brightness of 150%, any limit corresponding to this brightness or higher will enable the input brightness to be achieved.

Figure 12:
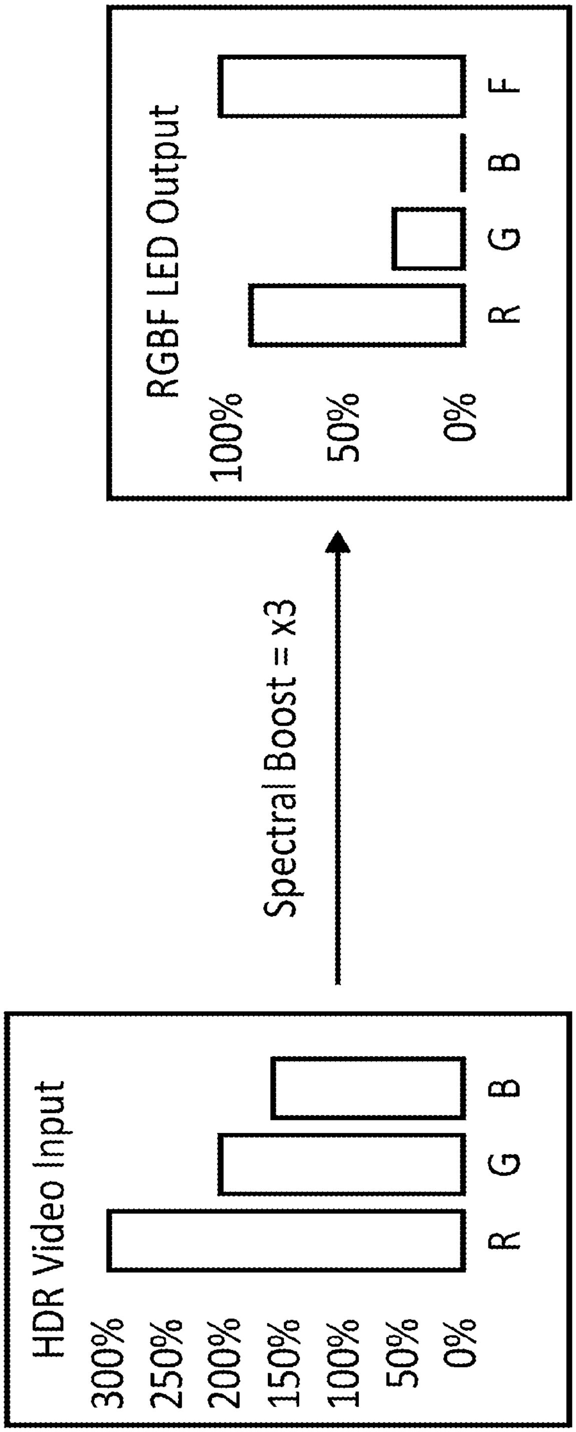
FIG. 12 illustrates a third example of converting an HDR RGB video input into an RGBF LED output incorporating spectral boost.

A particularly bright video input combined with a sufficiently high spectral boost value may result in RGBF drive levels that exceed 100%, meaning that even with the use of all four emitters the panel is unable to achieve the desired brightness. In this case, the expected behaviour is for the RGBF panel to cap the brightness of the pixel to the maximum it can achieve, while maintaining the same colour point. Note that this maximum brightness has at least one of the four output channels at the maximum brightness of 100% as shown in FIG. 12.

Figure 13:
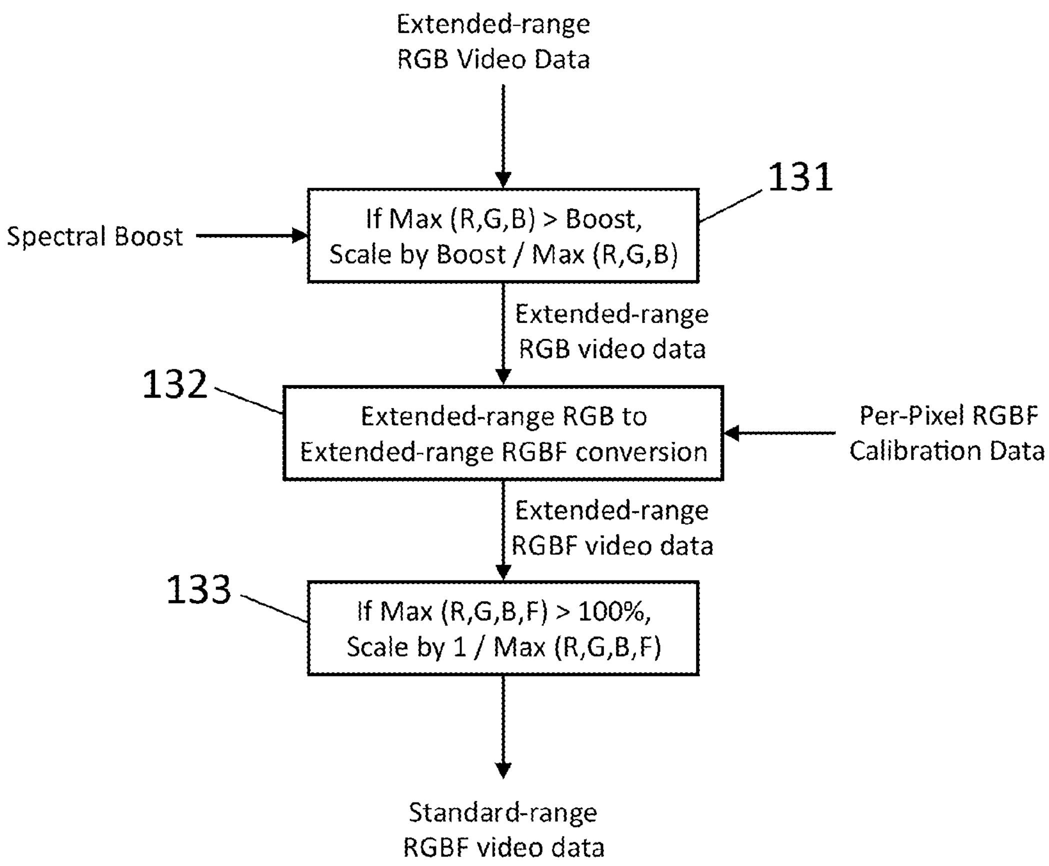
FIG. 13 illustrates a process for applying spectral boost alongside per-pixel calibration.

To implement the spectral boost functionality described above, the process of FIG. 13 can be implemented. Incoming RGB video levels are 'extended-range', meaning each channel may exceed 100%. At a first step, 131, these levels are compared on a pixel-by-pixel basis with the spectral boost value to see if the red, green or blue level exceeds the boost value. In this description, video levels are given as a percentage while the spectral boost value is given as a factor, so for the purposes of this comparison 100% is equivalent to ×1, 150% is equivalent to ×1.5, etc. If any of the video levels for a given pixel do exceed the boost value, all three video levels for that pixel are scaled by a factor of Boost/Max (R,G,B), such that the highest level in the resulting extended-range RGB video data cannot exceed the boost value. For example, with a boost value of ×1.5, the extended-range RGB video data levels cannot exceed 150%, which is one and a half times brighter than a conventional RGB panel would be able to achieve, matching the specified boost value.

At the next step, 132, these extended-range RGB video levels are converted to extended-range RGBF video levels such that the resulting extended-range RGBF levels achieve the same colour and brightness as the extended range RGB levels. This conversion may select any of the metameric mixes that meet this requirement, for example optionally using a spectral preference input to determine which specific mix to use. The nature of the extended-range conversion is similar to a standard range conversion; the only difference is that the input and output values (and hence also intermediate values) are permitted to exceed 100%.

Finally, at step 133, because it is not possible to drive the RGBF LEDs at levels exceeding 100%, a check must be performed to test whether any of the four levels does exceed 100%. If so, all four channels must be scaled by a factor of 1/Max (R,G,B,F) such that the highest level in the resulting RGBF output cannot exceed 100%, so the final values are now standard-range rather than extended-range.

Note that the extended-range RGB video data input and spectral boost value may vary from one pixel to the next. This results in significantly higher computational complexity compared to a rudimentary 2D, 2.5D or 3D LUT-based implementation, but offers dynamic per-pixel control over the maximum permitted brightness that such a LUT-based implementation is unable to deliver.

While the above description of Spectral Boost considers an LED unit with four emitters, Spectral Boost may also be applied for an LED unit with five or more emitters by using similar principles, such that the resulting brightness available when using at least one of the fourth, fifth or further emitters, possibly in conjunction with the red, green or blue emitters, is permitted to exceed the brightness available from the use of purely the red, green and blue emitters. This might be achieved by applying the same process of FIG. 13, but with step 132 performing an extended-range RGB to extended-range RGBFX conversion using per-pixel RGBFX calibration data (where X stands for the fifth and any further emitters) to produce extended-range RGBFX video data for step 133, where the maximum of all the five or more channels is used to downscale all five or more channels, ultimately producing standard-range RGBFX video data.

Spectral Balance

As has been mentioned, spectral balance is a parameter (or parameters) that indicates how to adjust the RGBF drive levels to maintain colour accuracy when the fourth emitter is used. In particular, this can be important when the screen is viewed by a non-standard, or non-human, observer such as a camera, or other optical detection device. That is because image capture devices, such as cameras, can distort characteristics such as the colour and the brightness. As such, the colour and brightness may need to be compensated in order to balance or calibrate for the change in the colour and/or the brightness caused by the image capture device.

Figure 14:
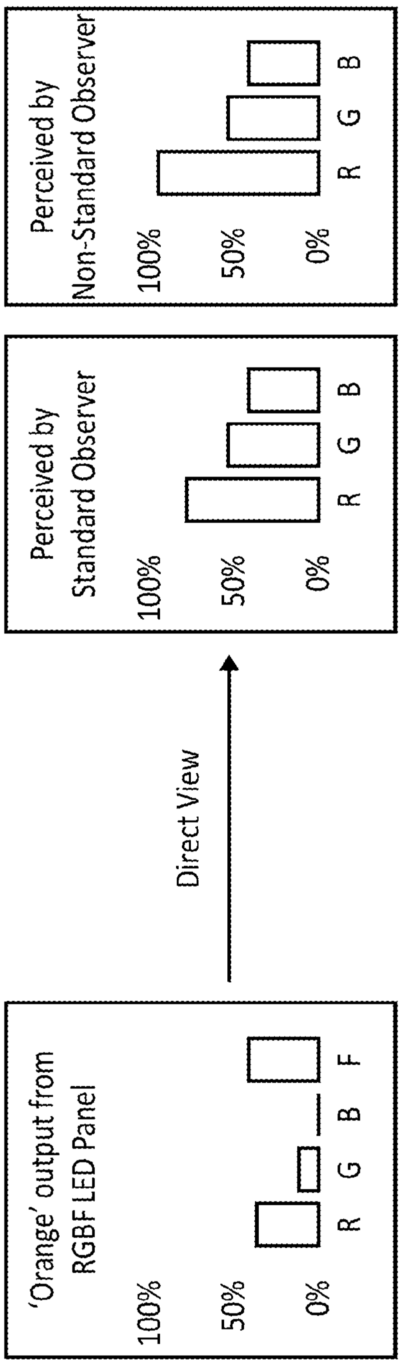
FIG. 14 illustrates differences in perception of an "orange" colour between a standard and non-standard observer.

The processing for an RGBF panel may adopt an algorithmic approach which enables use of the fourth LED while maintaining colour accuracy for a specific type of observer, such as the standard observer as defined by the CIE colour matching functions (or some similarly well-defined observer spectral sensitivities). For such a standard observer, metameric mixes for the same colour will be perceived to have similar appearance. However, a non-standard observer (such as a camera system) may be used, where the spectral sensitivities of the viewer are different to those of whichever standard observer the LED processing uses when determining metameric mixes. In this case, the non-standard observer will perceive different colours compared to the standard observer. For example, if the fourth emitter is white these principles are illustrated in FIG. 14. In this example, the output is perceived by a standard observer as the correct colour, while the non-standard observer perceives a different colour containing more red.

In many applications, it is desirable to prioritise the perception of the non-standard observer over the perception of the standard observer. For example, prioritising colour accuracy on-camera over colour accuracy when viewed by eye. This may therefore be viewed as non-standard viewer calibration.

Figure 15:
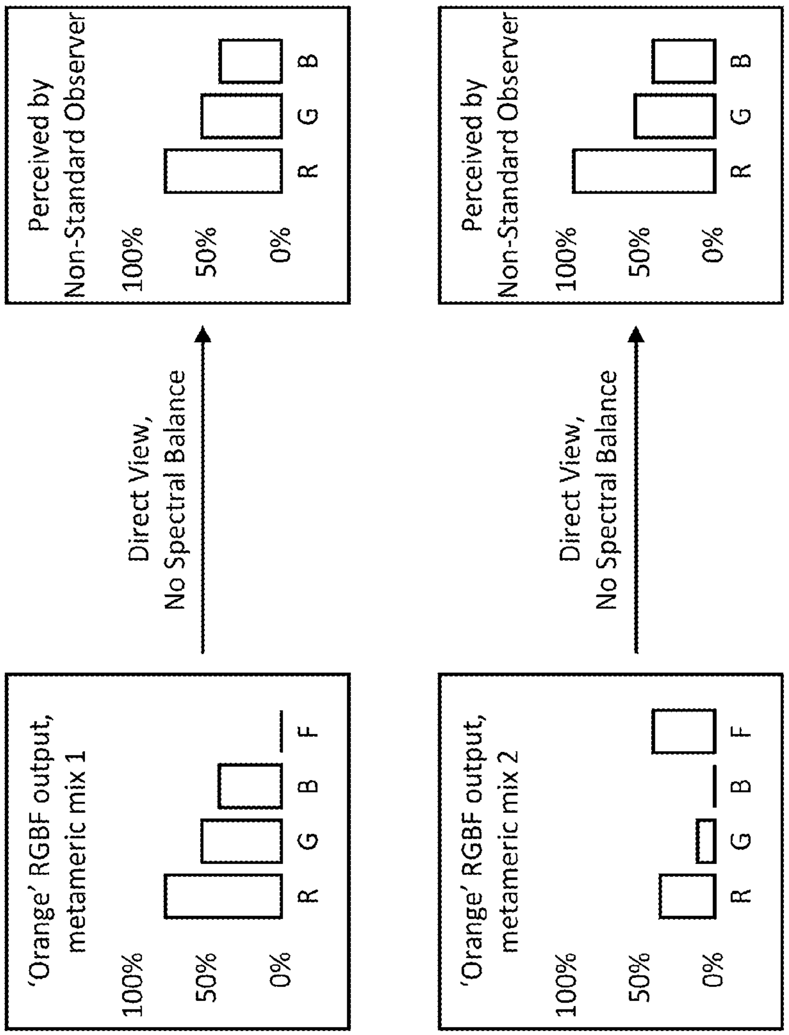
FIG. 15 illustrates differences in perception of an "orange" colour between a standard and non-standard observer when RGB and RGBF LEDs are used.

In this case, some mechanism is required to quantify the non-standard relationship between the perception of the fourth emitter and the RGB emitters. This could be achieved through direct measurement of the spectral output of the LEDs and the spectral sensitivity of the non-standard observer, but the tools required to achieve this are often not available 'on site' where such issues arise. Alternatively, two or more metameric mixes for the same colour might be displayed on the LED panels, and the user may be offered some controls to adjust the appearance of one or both mixes until they are perceived as identical by the non-standard observer. FIG. 15 illustrates the colour perceived by a non-standard observer, such as a camera, for an RGB metameric mix and an RGBF metameric mix. It is desirable for the two mixes to be as spectrally different to each other as possible, as this maximises the visibility of the perceived colour errors, though any two mixes with different spectral output for the same colour may be employed.

Figure 16:
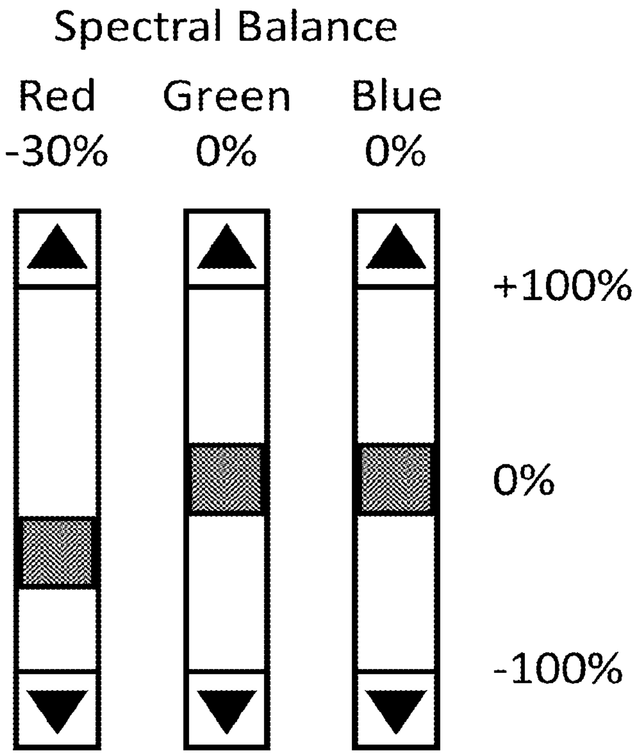
FIG. 16 illustrates use of GUI sliders for controlling spectral balance.

The user might then be offered controls to adjust R/G/B balance when the fourth emitter is in use. For example, as shown in FIG. 16, the user may be provided with three graphical user interface sliders, one for each of red, green and blue. The sliders can be adjusted from a central zero position, where no adjustment is provided, up to a positive 100% position and down to a negative-100% position. A positive spectral balance value for a given channel (red, green or blue) typically adjusts the output to contain a higher drive value for that channel, while a negative value typically results in a lower drive value for that channel, all provided that the fourth emitter is in use. If the F emitter colour is outside of the gamut of the RGB emitters, the reverse may instead be true. The more the fourth emitter contributes to the output, the more these adjustments apply. For example, with the red spectral balance set to −30% as the controls of FIG. 16 show, the RGBF output of the panel might be changed as is shown in FIG. 17.

Figure 17:
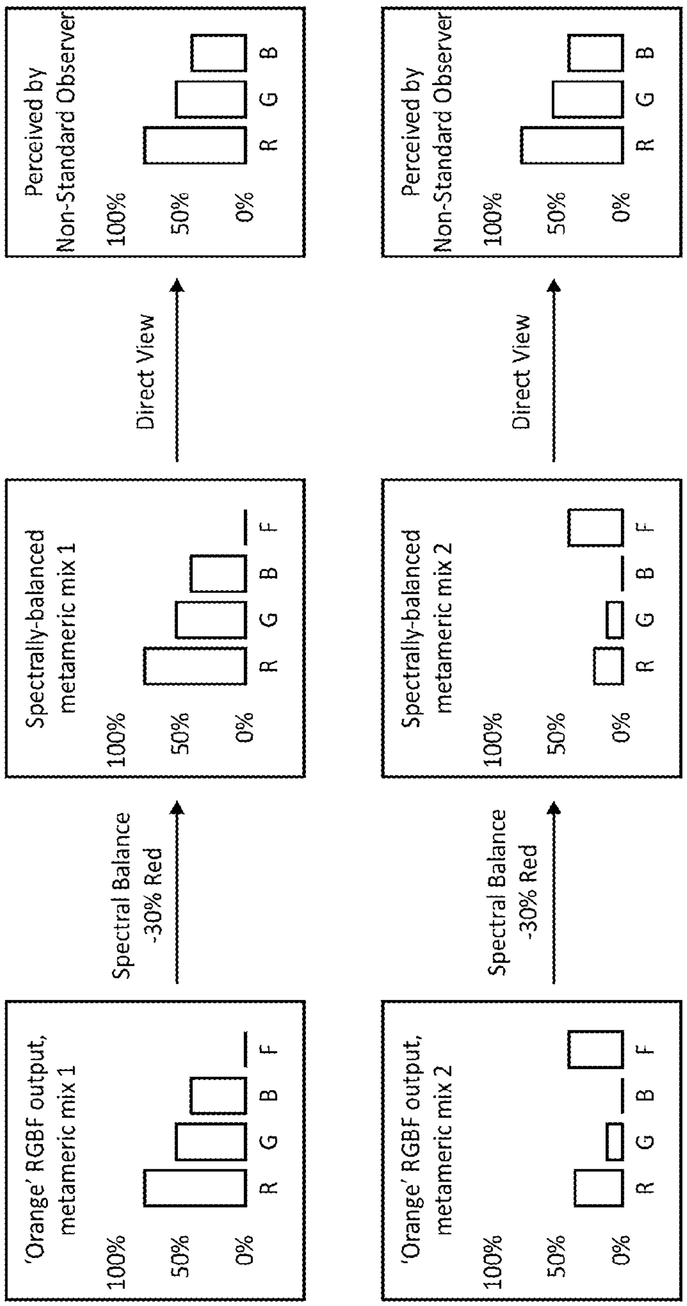
FIG. 17 illustrates an impact of spectral balance on perception of an orange colour produced by RGB LEDs and RGBF LEDs on a non-standard observer.

For metameric mix 1 in FIG. 17, applying a spectral balance of −30% for red does not change the output as the fourth channel is not in use. For metameric mix 2 however, the fourth channel is active and by default (without any spectral balance) the red drive level is reduced by an amount that maintains the desired overall colour and brightness for the standard observer. However, for a particular non-standard observer for which this spectral content appears too 'reddish' compared to metameric mix 1, specifying a spectral balance of −30% for red instructs the system that a reduction in the perceived amount of red is desired. Consequently, the brightness of the red LED is further reduced by an appropriate amount such that the same colour and brightness may be correctly perceived by the non-standard observer for both metameric mixes. This might be achieved by scaling the reduction in red by (100%−Rsb) where Rsb is the red spectral balance. For example, if for the standard observer the addition of some particular amount of F requires the red channel to be reduced from 0.75 to 0.35 (i.e. a reduction of 0.4), then for the non-standard observer a spectral balance of −30% for red would result in a reduction of 0.4×(100%−(−30%), which is 0.52. The final result for the red channel is therefore 0.75−0.52=0.23.

While the example above describes one potential mapping from the spectral balance parameter value to the desired scaling of the adjustment to the R/G/B channels, different mappings may alternatively be employed to achieve a similar effect.

While the example above considers solely the red channel, spectral balance adjustments to the green and blue channels may be similarly performed.

To determine the correct values for the three spectral balance controls, changes to these controls should typically update the metameric mixes from the panel in real time, such that the user can examine the output from the non-standard observer (e.g. view the camera output on a monitor) and adjust the controls until both mixes appear identical.

While the example here uses RGB controls to adjust the spectral balance, any other set of controls providing similar functionality (e.g. Hue, Saturation and Brightness controls) could be used to make adjustments, with the resulting values being translated back into R, G and B control values. While the example here uses white as the fourth emitter, there is no requirement for the fourth emitter to be any particular colour or brightness.

Additionally, more than one metameric mix could be displayed for a single colour, and/or multiple colours could be displayed (with two or more metameric mixes for each) to provide a larger number of visual comparisons. The user could then manually adjust the spectral balance for all of these simultaneously, or for each one independently, with a final spectral balance being determined from these multiple spectral balance inputs using a well-known approach such as averaging or least-squares fitting.

Alternatively, a closed-loop automated system could examine the output from the non-standard observer (e.g. measure the colour and brightness levels in different areas of the video signal from a camera) and automatically adjust the spectral balance controls in an iterative fashion to minimise the perceived difference between the metameric mixes with no further user input.

Figure 18:
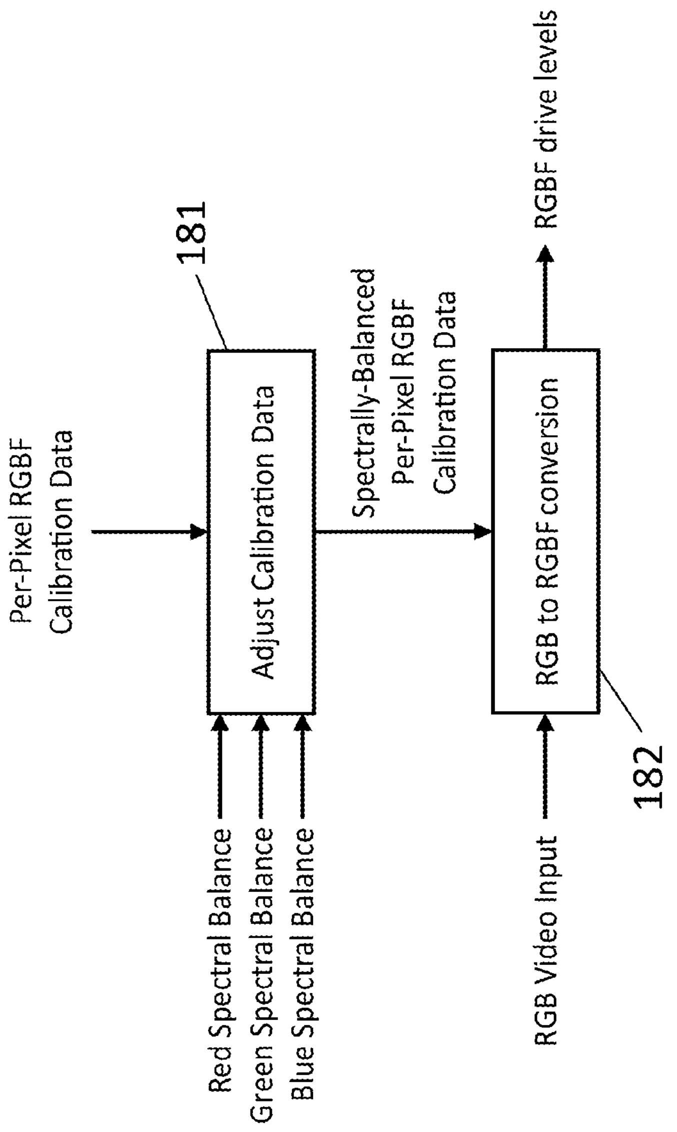
FIG. 18 illustrates a process for applying spectral balance controls to calibration data when producing RGBF drive levels from RGB video data.

To implement the application of spectral balance adjustments, the process illustrated in FIG. 18 can be implemented. Firstly, at step 181, Red, Green and Blue Spectral Balance control values are obtained and used to adjust the per-pixel RGBF calibration data. Depending on the nature of the calibration data format, this adjustment might take the form of scaling a subset of the calibration data by a factor derived from the red spectral balance value, a different subset by a factor derived from the green spectral balance value, and yet another subset by a factor derived from the blue spectral balance value. While various adjustments may be appropriate depending on the format of the calibration data, all such adjustments are intended to adapt the per-pixel calibration for better performance with a particular non-standard observer. Then, at step 182, the resulting 'spectrally-balanced' per-pixel RGBF calibration data may be used to inform a calibrated conversion from RGB video input levels to appropriate RGBF drive levels which will achieve the desired colour and brightness when viewed by the non-standard observer.

Equivalently, the two stages of this process may be combined (for example, in an optimised implementation with reduced computational complexity) such that the spectral balance values are applied directly to the conversion stage. However, the resulting effect on the output remains, in that the spectral balance values enable the system to achieve better colour accuracy when the four-emitter LEDs are viewed by a non-standard observer. Note that the RGB video input and spectral balance values may vary from one pixel to the next, offering dynamic per-pixel control over how the output from each pixel on each video frame should be adjusted for better colour accuracy with a non-standard observer, and this observer may also vary over time or for different areas of the screen.

While an aim is to maintain the exact colour in the LED panel's output as in the received RGB video data, it will be appreciated that in other arrangements it is deemed acceptable to produce a similar colour. For example, as close a colour as possible may be aimed for.

While the preceding description of spectral balance considers an LED unit with four emitters, spectral balance may also be applied for an LED unit with five or more emitters by using similar principles, such that colour consistency may be maintained for a non-standard observer when using any combination of the five or more emitters. A set of red, green and blue (or equivalent) spectral balance controls may be provided for each of the fourth, fifth and any further emitters, enabling independent manual or automated adjustment of the perceived output when using each of these fourth, fifth or further emitters. The required corrections may then be calculated independently for the use of each of the fourth, fifth and any further emitters (in the same way for each as described previously for the fourth emitter), with the results applied to correct each of the independent (standard-observer-based) adjustments of the red, green and blue drive levels that are required when using each of the fourth, fifth or any further emitters.

Figure 19:
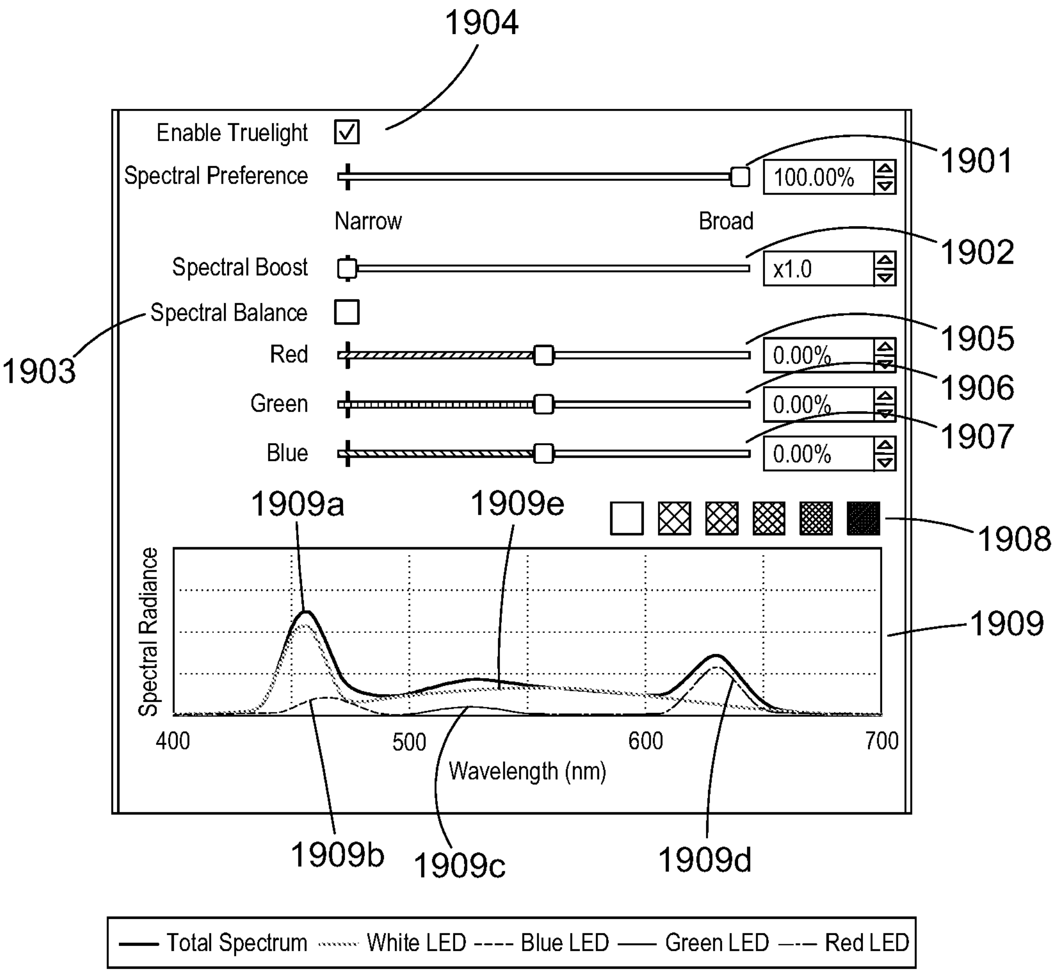
FIG. 19 illustrates a user interface for controlling spectral parameters.

FIG. 19 illustrates a user interface for controlling spectral parameters to set spectral parameter control values. A first user interface element 1901 is provided for adjusting spectral preference. This user interface element is a slider, which slides between 0% and 100%, where 0% indicates prefer RGB (narrow) and 100% indicates prefer the fourth LED (broad), e.g. white. A second user interface element 1902 is provided for adjusting spectral boost. This user interface is a slider. As the user slides the slider to the right, an increase in brightness is provided. The multiplication factor of the brightness boost is also represented. A spectral balance user interface element 1903 and an enable TrueLight user interface element 1904 are also provided. Both of these are toggle buttons for on or off. Three user interface elements 1905, 1906, 1907 are provided for adjusting Red, Green and Blue components of a spectrum respectively. These may also be considered spectral parameters. Each of these is a slider enabling the percentage of the respective colour to be increased or decreased. A number of example colour buttons 1908 are provided to allow the user to better understand different spectra. For example, if you click on any of these 6 colours the user will be able to see how each of these 6 colours will be mixed. In some arrangements, these may be the six key colour components in a single frame, or across a number of frames representing a scene of a video.

Each of these adjustment controls may be considered a spectral parameter as they are parameters that will impact the overall spectrum of light to be emitted when varied. Variation of each of these user interface elements will also produce a spectral parameter control value, i.e. data used to vary the spectral characteristics of the spectrum. It will be appreciated that controls are exemplary only and any suitable control element could be used.

A graphical representation 1909 of the spectrum of light being emitted, or to be emitted, is provided. This takes the form of a graph plotting wavelength against spectral radiance. However, it will be appreciated that any other form of spectral plot could be utilised. Advantageously, as the user adjusts spectral control characteristics, such as spectral preference, spectral balance or spectral boost, using their respective user interface elements 1901, 1902, 1903, 1905, 1906, 1907 the spectrum provided in the representation 1909 varies in shape. In this example, as the white colour button is selected from the colour buttons 1908, the spectrum is representative of how white light is being output. However, adjusting the spectral preference, for example, will show how white can be produced using a different balance between the four LEDs and as a result the overall spectrum of white light will change.

Light emitted by a single LED or range of LEDs is very difficult for a human eye to perceive subtle differences in, and even harder for the human brain to fully understand the differences that small, or in some circumstances large, adjustments to the colour, or other spectral characteristics, might have on the light emitted, or to be emitted. In particular, in the film and television industry, it can be important to understand whether or not small adjustments might have negative impact on lighting a subject or may look poor when recorded on camera. Hence, the representation 1909 provides an improved feedback to a user on the impact that colour and other spectral adjustments might have on the overall spectrum of light being produced. Hence, the technical task of controlling an LED lighting system is improved by providing this user interface for the user because the user is provided with a guided feedback mechanism to help better understand and produce better adjustments to light being, or to be, emitted. Without this feedback it is difficult for the user to accurately use the system. A result is that fewer adjustments will be needed to provide the desired light, reducing time required to iteratively evaluate potential spectral choices. In addition, this can save on production time, cost, and other negatives associated with having to re-record a scene due to unsatisfactory lighting or LED-based backgrounds. This technical effect is always present when adjusting any of these parameters using the interface of FIG. 19.

The graphical representation 1909 of the spectrum includes three plots. A total spectrum 1909*a* is provided, which shows the spectrum of the light to be, or being, displayed, emitted or output. The respective components of the spectrum are illustrated in their constituent parts, for example split by the LEDs producing the spectrum. A plot showing the spectral components provided to the total spectrum by the red LED, 1909*b*, green LED 1909*c*, and blue LED 1909*d* is shown. Then a plot showing the spectral components provided to the total spectrum by the white LED 1909*e* is shown. In other arrangements, a combined RGB plot could be provided in place of separate R, G and B plots. The presence of plots of the spectral components of each LED provides the user with additional visual feedback as to the impact that the RGB and White LEDs are having on the total spectrum. In turn, this provides advantageous visual guidance to the user as to the prevalence of the different LEDs to the total spectrum when adjusting spectral characteristics. This impact is illustrated in more detail with reference to FIG. 20.

Figure 20:
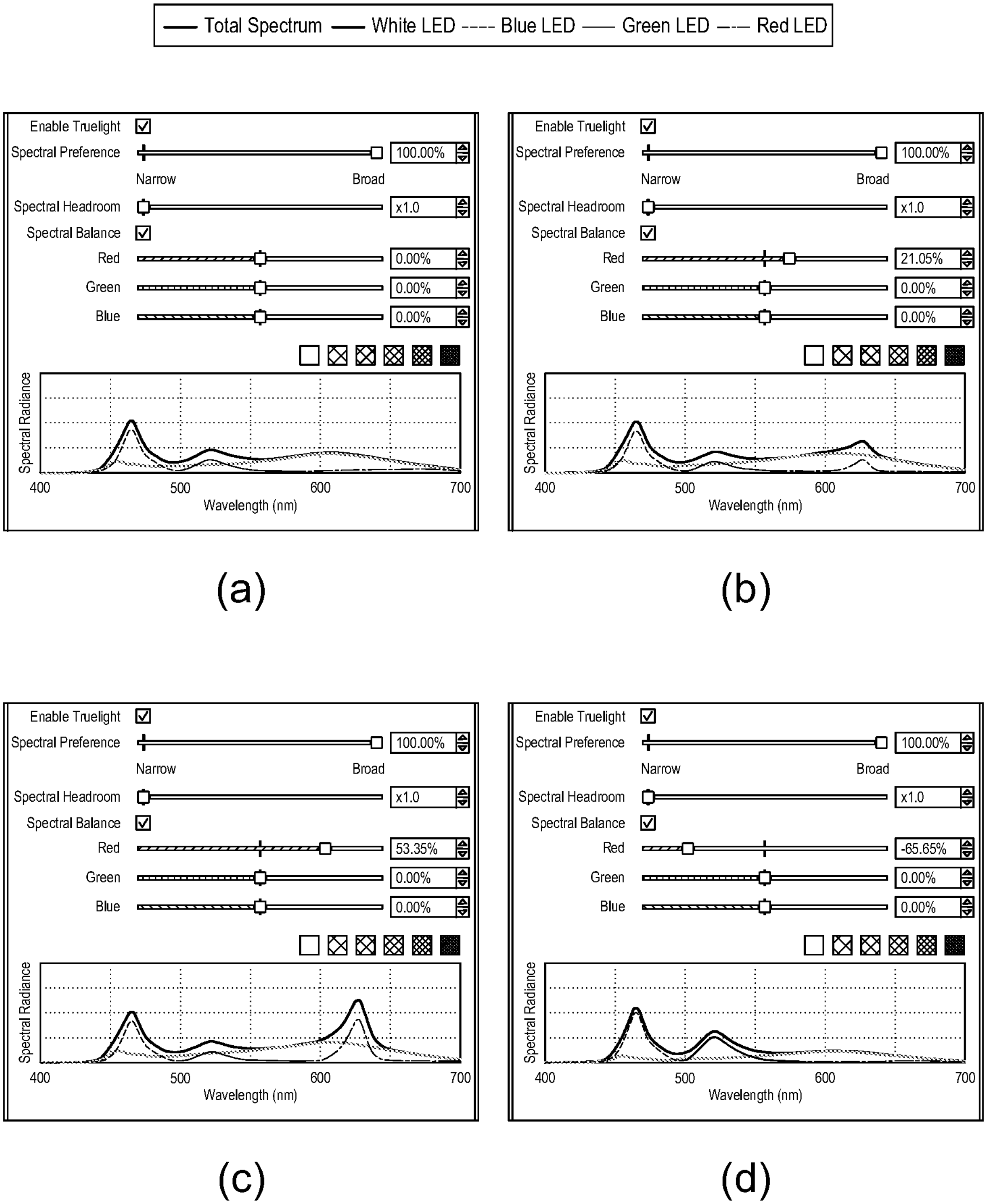
FIG. 20 illustrates how varying controls of the user interface impacts the visual feedback.

FIG. 20 illustrates how varying controls of the user interface impacts the visual feedback. In display (a) it can be seen that the Red, Green and Blue controls are all positioned in a central and equal position. At this point the blue LED has a high spectral radiance, the green a lower spectral radiance, and the red LED is off. The red LED is off because the spectral output of the white LED is sufficient to provide the required red components of the final spectrum alone.

In displays (b) and then (c) the impact of increasing the red component can be seen. As the red spectral component increases, the wavelength around the peak of the red LED increases. Direct feedback to the user as to how this increase is being delivered is therefore provided. The red LED has a relatively narrow range of wavelengths, therefore producing quite specific narrow-banded light.

In display (d) it can be see that the red component is reduced. Once, the slider for the red component passes the central position the amount of red in the overall spectrum has to be reduced. Since, when the red control was at a neutral position, e.g. as shown in display (a), the red LED was off, in order for the red component to reduce, the white LED has to reduce too. However, the impact of the white LED reducing its spectral radiance is that the blue and green LEDs have to increase their spectral radiance in order to balance the colour emitted. This is because as the white LED reduces its spectral radiance to reduce the red component in the emitted light, it has to also reduce its other spectral components, including the blue and green components of white. In this circumstance, because the radiance of the blue and green LEDs increases, the narrow band nature of the outputs of these LEDs is clearly represented in the total spectrum. The representation shown therefore illustrates to the user that when reducing the red component, narrow band blue and green components are required. This could negatively impact the recorded colour if the pixel or pixels being adjusted are on camera, or could impact the illumination if the pixel or pixels being adjusted are off camera. This is because the emitted light will have some potentially negative narrow band blue and green components. Hence, the representation at the bottom of the displays of FIG. 20 provides the user with useful feedback as to the overall spectral impact that minor adjustments have and how they impact other spectral characteristics of how the light is output.

System Associated Hardware

Hardware used to implement the various processes set-out above shall now be described with reference to FIG. 21, which illustrates a LED panel drive system. The system comprises two main components, the central controller 2110 and the LED panel 2120.

The central controller 2110 is operated by a user via a local user interface (UI) 2131 and/or remote UI 2132 for control and monitoring. This UI may be the same as the UI disclosed in relation to FIGS. 19 and 20. The user interface functionality operates via the CPU 2111 and memory 2112 of the central controller 2110. The central controller 2110 receives video in various standard formats (e.g. HDMI or SDI) and an FPGA 2113 is used to perform 'standard' video processing (such as scaling to adjust the size, basic colour adjustments, etc.) and then some LED-specific 'pixel processing' (e.g. splitting the raster up into panel-sized chunks, per-panel rotation, etc.). These 'chunks' are then transmitted over an Ethernet network 2140 to an array of LED panels including the LED panel 2120 illustrated. The FPGA 2113 may buffer video pixels and associated data in local memory 2114.

Each LED panel 2120 consists of one receiver card 2121 and one or more LED modules 2122. Only one LED panel is illustrated, however it will be appreciated that the central controller 2110 will drive multiple LED panels. The receiver card can utilise an FPGA which also contains an embedded CPU and memory as shown in FIG. 21. In FIG. 21 the functional components of the FPGA are also shown. For example, within the FPGA a 'chunk' of video data is received for the panel associated with the receiver card 2121 and input pipeline processing is performed. For example, this input processing may include displaying test patterns or an on-screen-display, converting the signal format from gamma-encoded SDR or HDR-encoded to 'linear light' signals as required by the LED driver chips, etc. A per-pixel calibration is then applied, based on calibration data read from the LED modules and provided to the FPGA module via the CPU. The CPU 2111 in the central controller 2110 can communicate with the embedded CPU in each FPGA receiver card associated with a respective panel over the same Ethernet network that the chunks of video data are sent. This can therefore be used for management, status and control. After the per-pixel calibration, corrections are applied (e.g. to correct for non-linearities in the driver chips and/or LEDs), the signal is buffered so the entire screen can be updated simultaneously, then reformatting can take place as required for the particular brand and model of LED driver chips in use, then the data is transmitted onto the LED modules, such as LED module 2122.

Each LED module, such as LED module 2122, has chains of LED driver chips 2123a, 2123b, each of which will drive a number of LED units 2124a, 1924b, possibly in a rectangular grid, e.g. 16×8 pixels. Each unit may comprise a plurality of LEDs, each of differing colour. For example, an RGBF LED unit may include a Red LED, Green LED, Blue LED and Fourth LED, such as White. The LEDs may be a single plastic package containing four (R, G, B and F) LED dies, or a grouped plurality of packages each containing one or more colours of LED die. Such a grouping of LEDs, either in a single package or multiple packages, may be referred to as an LED unit. While one LED module is shown with one chain of two LED driver chips, it will be appreciated that each panel may contain many more modules, each module may contain many more chains, and each chain may contain many more LED driver chips. A flash memory 2125 contained within the LED module 2122 stores the data for the LED units 2124a, 2124b on that module, so if the LED modules get swapped around in the field, the calibration data 'travels' with the LED units to which the data pertains.

Each panel also 'passes through' the contents of the Ethernet signal, such that multiple panels may be connected in a chain to fully utilise the Ethernet bandwidth.

Figure 21:
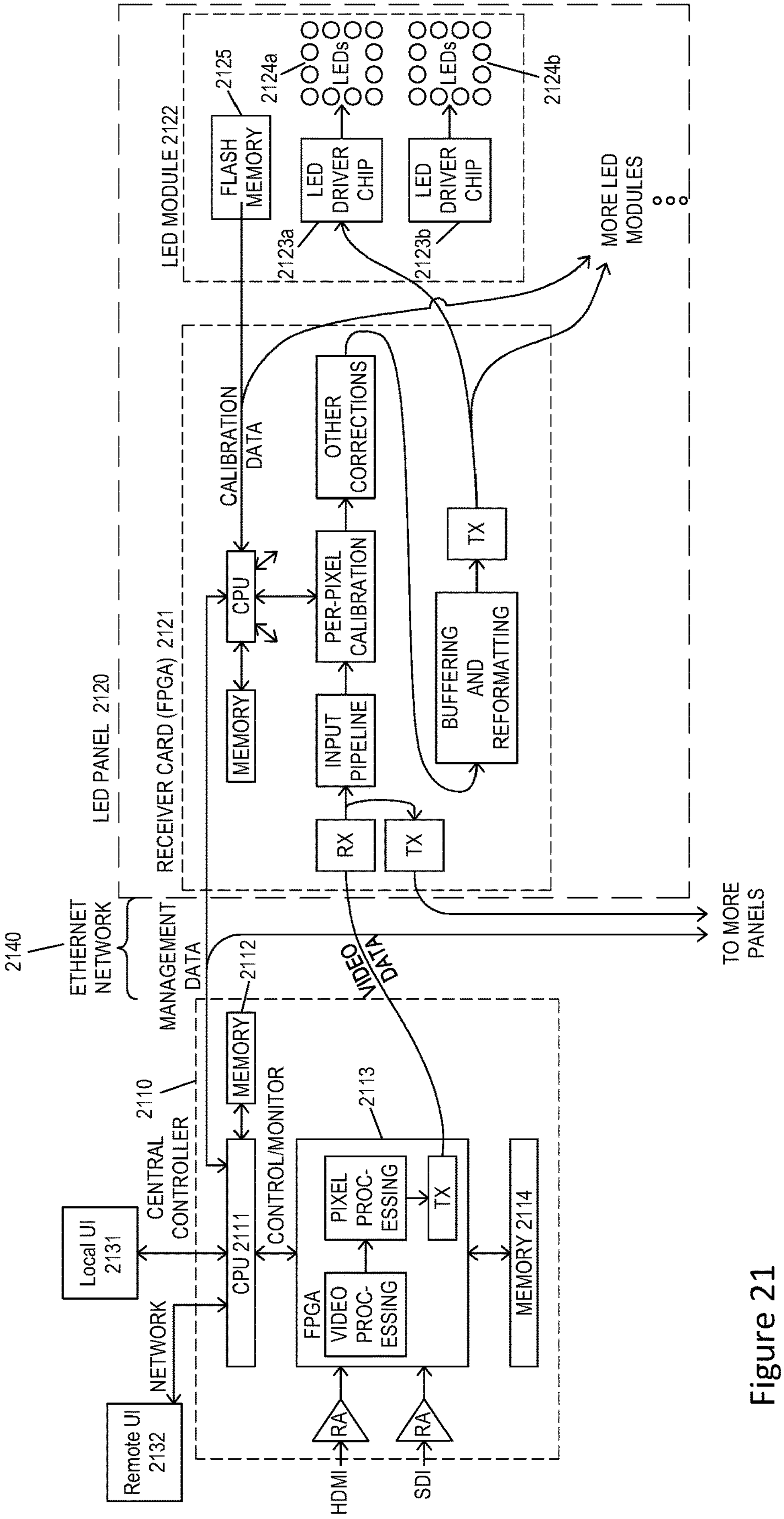
FIG. 21 illustrates a system on which the processes disclosed herein may operate.

While most of the processing disclosed in this document is shown to be implemented within the receiver card in FIG. 21, it will be appreciated that it needn't be. For example, in other arrangement the processing may be split between the central controller and the receiver cards, or all of the processing may be carried out by the central controller. However, the implementation of FIG. 21 is advantageous for a number of reasons. It minimises the bandwidth requirements from the processor to the panels, plus all the calibration data is stored in flash chips within the panels allowing panels to be moved around and the calibration data easily maintained. In addition, by pushing the processing to each receiver card, parallel processing is maximised which can increase the processing speed achievable.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For example, such computer code may be implemented within the receiver card 2121, and/or the central controller 2110. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein.

While LED primarily refers to a Light Emitting Diode, it will be appreciated that any suitable light emitter could be utilised and therefore LED can, in some arrangements, be considered to mean Light Emitting Device.

An LED drive signal is a signal, message, or means of control that instructs one or more LEDs how to operate. For example, a drive signal may indicate a brightness for an LED of a certain colour, or a brightness for each colour of an LED unit. It will be appreciated that reference to a drive signal may refer to a drive signal comprising a plurality of driving component. For example, each driving component may drive a different LED, or group of LEDs. Hence, a drive signal can also be referred to as drive signals wherein each drive signal drives a different LED, or group of LEDs.

Reference to a colour and/or brightness being substantially produced refers to a colour and/or brightness being produced such that, in isolation, it may not be apparently different to the intended colour and/or brightness to the human eye. In some circumstances small differences in colour and/or brightness may be noticeable, but the colour and/or brightness may still be substantially produced. In such circumstances, the production of the colour and/or brightness being produced relative to other colours and/or brightnesses being produced may be relevant. In some circumstances a more significant difference in one of brightness or colour may be noticeable while the other may be visually equivalent.

The invention claimed is:

1. A computer-implemented method for displaying spectral components of light to be, or being, emitted by one or more components of a display panel, the method comprising:

providing, to a user display of a user device, one or more representations of the spectral components of light to be, or being, emitted by the one or more components of the display panel;

receiving, from a user interface of the user device, one or more spectral parameter control values indicative of a variation of the spectral components of light to be, or being, emitted;

providing, to the user display, an updated representation of the spectral components of light to be, or being, emitted, wherein the updated representation of the spectral components of light is adjusted based on the one or more spectral parameter control values; and wherein the one or more representations of the spectral components of light to be, or being, emitted are spectral plots of the light.

2. The method of claim 1, wherein the display panel comprises a plurality of RGBF LED units, each RGBF LED unit comprising a Red LED, a Green LED, a Blue LED and a Fourth-colour LED that is not the same colour as the Red, Green or Blue LEDs.

3. The method of claim 2, wherein the one or more representations of the spectral components of light comprises one or more of:

a representation of the total spectrum of light to be, or being, emitted;

a representation of a spectral component provided by the Red LED;

a representation of a spectral component provided by the Green LED;

a representation of a spectral component provided by the Blue LED; and a representation of a spectral component provided by the Fourth-colour LED.

4. The method of claim 2, wherein the variation is indicative of the effect of varying drive signals to one or more of the LEDs of the RGBF LED unit.

5. The method of claim 2, wherein one of the one or more spectral parameter control values shifts a spectral balance between use of the Red, Green and Blue LEDs with respect to use of the Fourth-colour LED.

6. The method of claim 2, wherein one of the one or more spectral parameter control values varies one or more brightness levels of the LEDs while substantially maintaining a colour and a brightness defined by received video data.

7. The method of claim 6, wherein the brightness of light emitted by the one or more components of a display panel is increased.

8. The method of claim 2, wherein the one or more spectral parameter control values are indicative of one or more of:

(i) an instruction for one or more LED units of the plurality of LED units to prioritise use of the Fourth-colour LED over the Red, Green and Blue LEDs to substantially produce the colour and the brightness defined by received video data;

(ii) an instruction for the one or more LED units of the plurality of LED units to prioritise use of the Red, Green and Blue LEDs over the Fourth-colour LED to substantially produce the colour and the brightness defined by received video data; and (iii) an instruction for the one or more LED units of the plurality of LED units to balance in a specific weighting the use of the Red, Green and Blue LEDs versus the Fourth-colour LED to substantially produce the colour and the brightness defined by received video data.

9. The method of claim 2, wherein the fourth-colour LED is white.

10. The method of claim 1, wherein the one or more representations of the spectral components of light to be, or being, emitted relate to a pixel or a group of pixels of received video data.

11. The method of claim 1, wherein the spectral plots are graphically presented as graphs of linear radiance with respect to wavelength.

12. The method of claim 1, further comprising providing a user interface element as part of the user interface for a user to control the one or more spectral parameter control values.

13. The method of claim 1, wherein the one or more spectral parameter control values are received responsive to a user viewing the representations of the spectral components of light on the user display.

14. The method of claim 1, further comprising:

receiving, from the user interface responsive to a user viewing the updated representation of the spectrum of light to be, or being, emitted, one or more updated spectral parameter control values indicative of a further variation of the spectral components.

15. A non-transitory computer readable medium comprising computer-readable code arranged to implement the method of claim 1.

16. A system comprising one or more processors arranged to perform the method of claim 1.

17. The system of claim 16, wherein the system further comprises the user interface and the user display.

* * * * *